United States Patent
LeBlanc et al.

(10) Patent No.: US 10,495,825 B2
(45) Date of Patent: Dec. 3, 2019

(54) ARCHITECTURE FOR A FIBER OPTIC NETWORK

(71) Applicant: CommScope Technologies LLC, Hickory, NC (US)

(72) Inventors: Thomas G. LeBlanc, Westminster, MA (US); Bryan Kennedy, Norcross, GA (US); Erik J. Gronvall, Bloomington, MN (US); Douglas C. Ellens, Buffalo, MN (US)

(73) Assignee: CommScope Technologies LLC, Hickory, NC (US)

( * ) Notice: Subject to any disclaimer, the term of this patent is extended or adjusted under 35 U.S.C. 154(b) by 72 days.

(21) Appl. No.: 15/161,914

(22) Filed: May 23, 2016

(65) Prior Publication Data

US 2016/0341911 A1 Nov. 24, 2016

Related U.S. Application Data

(63) Continuation of application No. 14/574,672, filed on Dec. 18, 2014, now Pat. No. 9,348,097, which is a
(Continued)

(51) Int. Cl.
*G02B 6/38* (2006.01)
*G02B 6/44* (2006.01)

(52) U.S. Cl.
CPC ......... *G02B 6/3879* (2013.01); *G02B 6/3807* (2013.01); *G02B 6/3885* (2013.01);
(Continued)

(58) Field of Classification Search
CPC .... G02B 6/403; G02B 6/3807; G02B 6/3849; G02B 6/3879; G02B 6/3885; G02B 6/3887; G02B 6/3894; G02B 6/4429; G02B 6/443; G02B 6/4439; G02B 6/4452; G02B 6/4457; G02B 6/4471
(Continued)

(56) References Cited

U.S. PATENT DOCUMENTS 3,260,794 A 7/1966 Fred
5,125,060 A 6/1992 Edmundson
(Continued)

FOREIGN PATENT DOCUMENTS

AU 2011304689 B2 10/2014
CN 201352702 Y 11/2009
(Continued)

OTHER PUBLICATIONS

FTTA Fiber to the Antenna Brochure, 4 pages (2012).
(Continued)

*Primary Examiner* — Michael P Mooney
(74) *Attorney, Agent, or Firm* — Merchant & Gould P.C.

(57) ABSTRACT

The present disclosure relates to a fiber optic network architecture that uses outside plant fan-out devices to distribute optical signals between fiber distribution hubs and multi-service terminals. The network architecture can also include collector boxes positioned at selected locations of the network architecture. Additionally, patching systems can be used in facilitating upgrading the capacity of the fiber optic network.

16 Claims, 20 Drawing Sheets

Related U.S. Application Data continuation of application No. 13/136,623, filed on Aug. 2, 2011, now Pat. No. 8,961,035.

(60) Provisional application No. 61/370,073, filed on Aug. 2, 2010.

(52) U.S. Cl.
CPC ......... *G02B 6/3887* (2013.01); *G02B 6/3894* (2013.01); *G02B 6/443* (2013.01); *G02B 6/4429* (2013.01); *G02B 6/4457* (2013.01); *G02B 6/4471* (2013.01); *Y10T 29/49826* (2015.01)

(58) Field of Classification Search
USPC ....... 385/24, 53–54, 76, 100, 102, 106, 109, 385/113, 134–135, 139, 78
See application file for complete search history.

(56) References Cited

U.S. PATENT DOCUMENTS

| | | |
|---|---|---|
| 5,210,812 A | 5/1993 | Nilsson et al. |
| 5,242,315 A | 9/1993 | O'Dea |
| 5,471,555 A | 11/1995 | Braga et al. |
| 5,966,489 A | 10/1999 | Harwell et al. |
| 5,997,186 A | 12/1999 | Huynh et al. |
| RE36,529 E | 1/2000 | Lewis et al. |
| RE36,592 E | 2/2000 | Giebel et al. |
| 6,104,855 A | 8/2000 | Jeon |
| 6,364,539 B1 | 4/2002 | Shahid |
| 6,438,299 B1 | 8/2002 | Brown et al. |
| 6,796,821 B2 | 9/2004 | Cairns et al. |
| 7,054,536 B2 | 5/2006 | Sun |
| 7,088,893 B2 | 8/2006 | Cooke et al. |
| 7,120,347 B2 | 10/2006 | Blackwell, Jr. et al. |
| 7,266,274 B2 | 9/2007 | Elkins, II |
| 7,277,614 B2 | 10/2007 | Cody et al. |
| 7,285,003 B2 | 10/2007 | Cairns et al. |
| 7,346,243 B2 | 3/2008 | Cody et al. |
| 7,349,605 B2 | 3/2008 | Noonan et al. |
| 7,409,127 B1 | 8/2008 | Hurley et al. |
| 7,416,347 B2 * | 8/2008 | Livingston ........... G02B 6/3831 385/53 |
| 7,428,366 B2 | 9/2008 | Mullaney et al. |
| 7,469,091 B2 | 12/2008 | Mullaney et al. |
| 7,489,849 B2 | 2/2009 | Reagan et al. |
| 7,519,258 B2 | 4/2009 | Wilken et al. |
| 7,555,181 B2 | 6/2009 | Temple, Jr. et al. |
| 7,565,055 B2 | 7/2009 | Lu et al. |
| 7,609,925 B2 | 10/2009 | Gronvall et al. |
| 7,623,749 B2 | 11/2009 | Reagan et al. |
| 7,627,222 B2 | 12/2009 | Reagan et al. |
| 7,680,388 B2 | 3/2010 | Reagan et al. |
| 7,686,519 B2 | 3/2010 | Lu |
| 7,693,374 B2 | 4/2010 | Cody et al. |
| 7,729,583 B2 | 6/2010 | Elkins, II et al. |
| 7,729,584 B2 | 6/2010 | Cody et al. |
| 7,805,044 B2 | 9/2010 | Reagan et al. |
| 7,941,027 B2 | 5/2011 | Mertesdorf et al. |
| 8,041,166 B2 | 10/2011 | Kachmar |
| 8,041,178 B2 | 10/2011 | Lu et al. |
| 8,050,529 B2 | 11/2011 | Wilken et al. |
| 8,068,712 B2 | 11/2011 | Reagan et al. |
| 8,172,465 B2 | 5/2012 | Kleeberger |
| 8,297,854 B2 | 10/2012 | Bickham et al. |
| 8,301,004 B2 | 10/2012 | Cooke et al. |
| 8,401,353 B2 | 3/2013 | Barker et al. |
| 8,472,767 B2 | 6/2013 | Easton et al. |
| 8,498,511 B2 | 7/2013 | Reagan et al. |
| 8,532,490 B2 | 9/2013 | Smith et al. |
| 8,842,954 B2 | 9/2014 | Burris et al. |
| 8,948,557 B2 | 2/2015 | Islam |
| 8,961,035 B2 | 2/2015 | LeBlanc et al. |
| 9,057,862 B2 | 6/2015 | Strasser et al. |
| 9,069,151 B2 | 6/2015 | Conner |
| 9,078,287 B2 | 7/2015 | Khemakhem et al. |
| 9,182,564 B2 | 11/2015 | Strasser et al. |
| 2003/0210861 A1* | 11/2003 | Weiss ........................ B41J 2/45 385/33 |
| 2005/0259928 A1 | 11/2005 | Elkins, II et al. |
| 2006/0093277 A1 | 5/2006 | Mulligan |
| 2006/0127026 A1 | 6/2006 | Beck |
| 2006/0133758 A1 | 6/2006 | Mullaney et al. |
| 2006/0147172 A1 | 7/2006 | Luther et al. |
| 2006/0269208 A1 | 11/2006 | Allen et al. |
| 2007/0189691 A1 | 8/2007 | Barth et al. |
| 2008/0152292 A1 | 6/2008 | Wilken et al. |
| 2008/0193091 A1 | 8/2008 | Herbst |
| 2008/0310796 A1 | 12/2008 | Lu |
| 2008/0310798 A1 | 12/2008 | Cody et al. |
| 2009/0148101 A1 | 6/2009 | Lu et al. |
| 2009/0269013 A1 | 10/2009 | Durand et al. |
| 2010/0092133 A1 | 4/2010 | Conner |
| 2010/0284662 A1 | 11/2010 | Reagan et al. |
| 2010/0329625 A1 | 12/2010 | Reagan et al. |
| 2011/0103803 A1* | 5/2011 | Kolesar ................ G02B 6/4472 398/142 |
| 2012/0057821 A1 | 3/2012 | Aronson et al. |
| 2012/0134629 A1 | 5/2012 | Lu et al. |
| 2012/0189260 A1* | 7/2012 | Kowalczyk .............. G02B 6/44 385/135 |
| 2013/0146355 A1 | 6/2013 | Strasser et al. |
| 2013/0294735 A1 | 11/2013 | Burris et al. |
| 2014/0056561 A1 | 2/2014 | Lu et al. |
| 2014/0219621 A1 | 8/2014 | Barnette, Jr. et al. |
| 2014/0241670 A1 | 8/2014 | Barnette, Jr. et al. |
| 2016/0085032 A1 | 3/2016 | Lu et al. |

FOREIGN PATENT DOCUMENTS

| | | |
|---|---|---|
| DE | 100 08 613 A1 | 9/2001 |
| EP | 0 189 609 B1 | 5/1990 |
| EP | 0 880 212 A2 | 11/1998 |
| EP | 2 253 980 A1 | 11/2010 |
| EP | 2 330 707 A1 | 6/2011 |
| EP | 2 619 617 B1 | 12/2016 |
| JP | 60-169813 | 9/1985 |
| WO | WO 2006/113726 A1 | 10/2006 |
| WO | WO 2009/048506 A1 | 4/2009 |
| WO | WO 2014/123940 A1 | 8/2014 |

OTHER PUBLICATIONS

Optical Fiber Distribution Cable (OFDC), ADC Telecommunications, 4 pages (Jul. 1999).
Siecor Back-fed Cable Stub Installation, Siecor Recommended Procedure SRP-009-002 Issue 1, pp. 1-3 (Jan. 1993).
Siecor Front-fed Cable Stub Installation, Siecor Recommended Procedure SRP-009-003 Issue 1, pp. 1-4 (Apr. 1993).
Fiberall Corporation, "Multi-Fiber Node Connect Service Cable", Captured by Archive.org on Jan. 7, 2009 Available at: http://web.archive.org/web/20090107035156/http://www.fiberall.com/multi_fiber.html.
The Fiber Optic Association, Inc., "Fiber Optic Cable", Captured by Archive.org on Mar. 30, 2009 Available at: http://web.archive.org/web/20090330122119/http://thefoa.org/tech/ref/basic/cable.html.
Timbercon, "Couplers and Splitters", Captured by Archive.org on Mar. 10, 2009 Available at: http://web.archive.org/web/20090310232921/http:/www.timbercon.com/Couplers-Splitters/index.html.
Fanout/Breakout Cables, http://www.fibertronics-store.com/Fanout-Breakout-Cables_c35.htm, 4 pages (Copyright 2011-2015).
MPO Connector Family (Multifiber Push-On), 4 pages (Copyright 2014).
MPO Connector Patch Cord, http://www.furukawa.co.jp/connector/mpo.htm, 3 pages (Copyright 2011).

(56) References Cited

OTHER PUBLICATIONS

MPO Patch Cord/Fan-out Cord, http://web.archive.org/web/20020602154736/http://www.furukawa.co.jp/connector/mpo.htm, 4 pages (Copyright 2001).

* cited by examiner

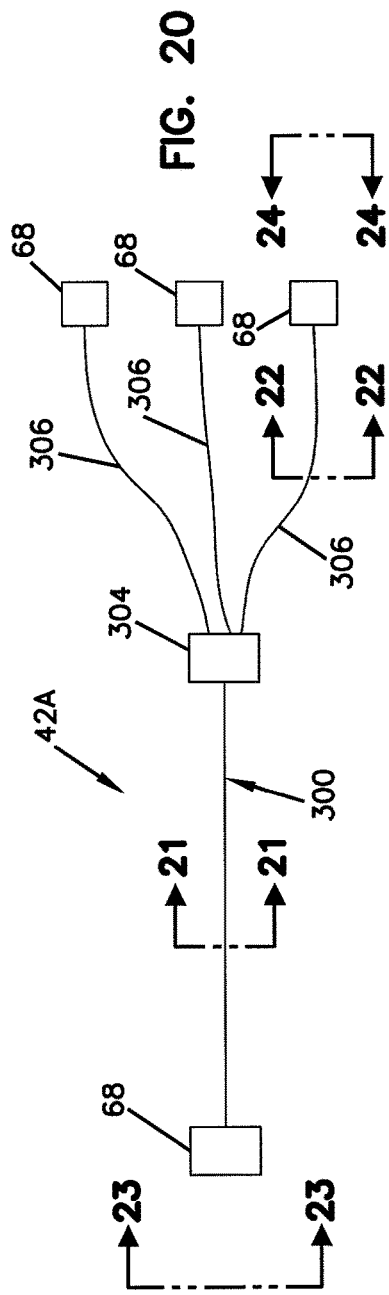
FIG. 20
FIG. 21
FIG. 22
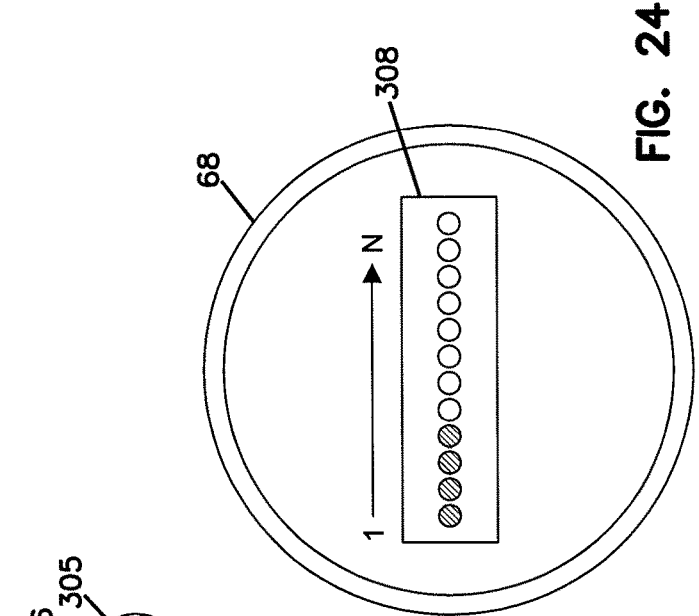
FIG. 24
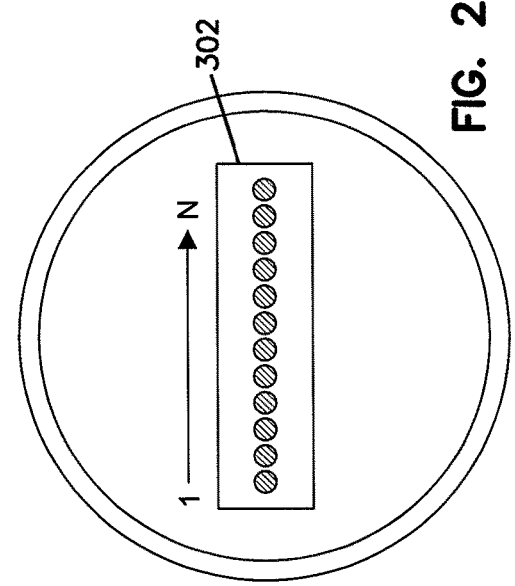
FIG. 23

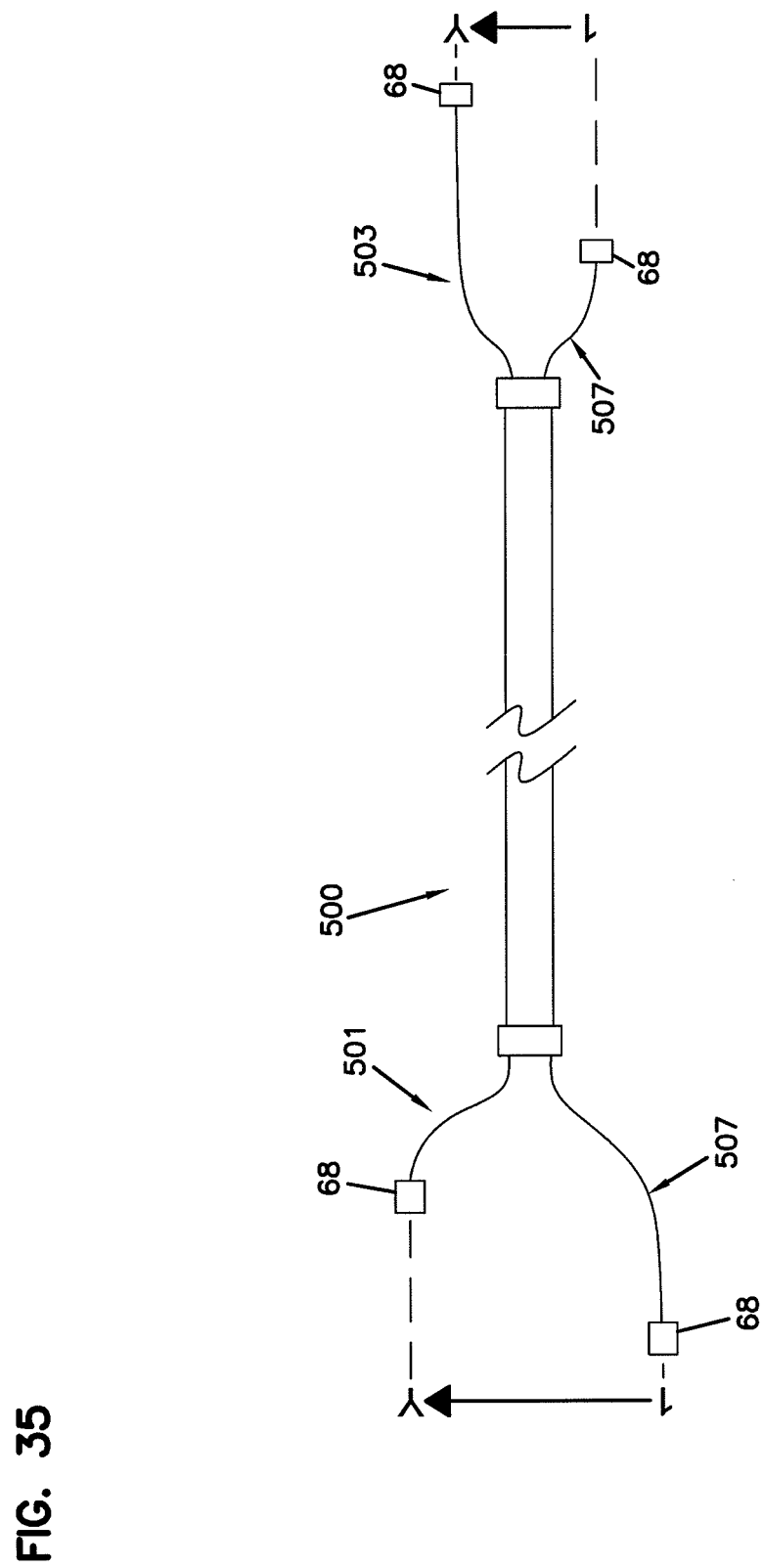

ARCHITECTURE FOR A FIBER OPTIC NETWORK

CROSS-REFERENCE TO RELATED APPLICATION

This application is a continuation of application Ser. No. 14/574,672, filed Dec. 18, 2014, now issued as U.S. Pat. No. 9,348,097, which is a continuation of application Ser. No. 13/196,623, filed Aug. 2, 2011, now U.S. Pat. No. 8,961,035, which application claims the benefit of provisional application Ser. No. 61/370,073, filed Aug. 2, 2010, which applications are incorporated herein by reference in their entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

An example network can include a central office that connects a number of end subscribers (also called end users herein) in a network. For example, FIG. 1 is a schematic diagram of a network 10 including a central office 11 that connects a number of subscribers 15 in the network 10. The central office can additionally connect to one or more larger networks, such as the Internet (not shown) and a public switched telephone network (PSTN).

Some cables in the network 10 can be branched out from main cable lines 12 and routed to fiber distribution and access terminals (e.g., fiber distribution hubs or pedestals). For example, feeder cables can branch from main cable lines 12 at branch points and be routed to FDHs 13. Such branched cables might extend from the FDHs 13 to smaller fiber access terminals (e.g., optical network terminals or drop terminals) 14 directly adjacent the business or home to which service may be provided. The various lines of the network can be aerial or housed within underground conduits.

Splitters used in FDHs 13 can accept feeder cables having a number of fibers and may split signals carried on those incoming fibers into, for example, 216 to 432 individual signals that may be associated with a like number of end user locations 15. In typical applications, an optical splitter is provided prepackaged in an optical splitter module housing and provided with splitter output pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to fiber distribution and access terminals as required.

Improvements to current fiber networks are desirable.

SUMMARY

Certain aspects of the disclosure relate to architectures for fiber optic networks that allow for rapid fiber deployment.

Certain aspects of the disclosure relate to architectures for fiber optic networks that allow for efficient system upgrades.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 20 schematically shows a hardened outside plant fan-out device that can be used with the architecture of FIG. 2;

FIG. 21 is a cross-sectional view taken along section line 21-21 of FIG. 20;

FIG. 22 is a cross-sectional view taken along section line 22-22 of FIG. 20;

FIG. 23 is a cross-sectional view taken along section line 23-23 of FIG. 20;

FIG. 24 is a cross-sectional view taken along section line 24-24 of FIG. 20;

FIG. 35 illustrates a cable arrangement in accordance with the principles of the present disclosure.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
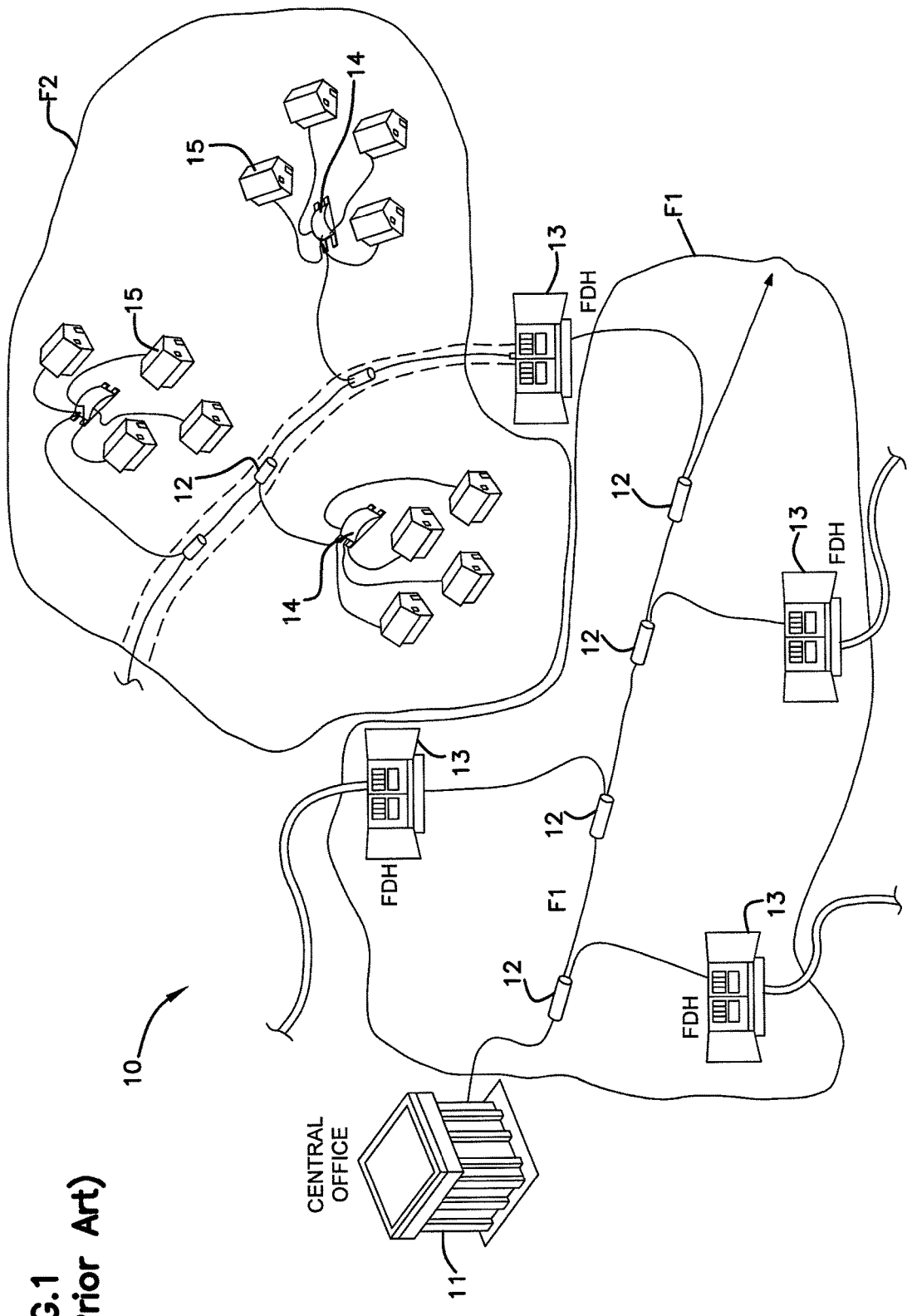
FIG. 1 shows a prior art telecommunication network.
Figure 2:
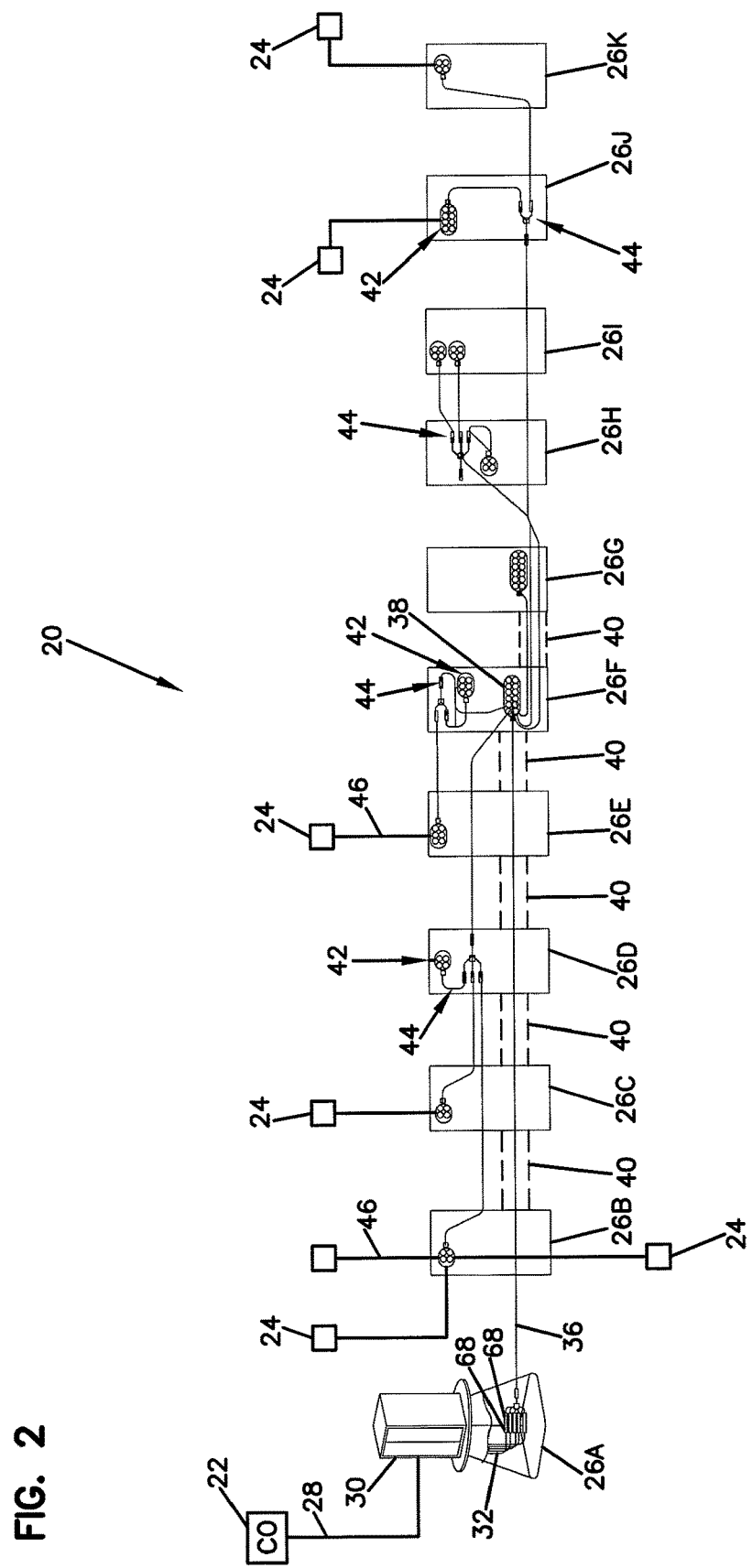
FIG. 2 shows an example architecture for a fiber optic network in accordance with the principles of the present disclosure.

FIG. 2 shows example architecture 20 for a fiber optic network in accordance with the principles of the present disclosure. The architecture 20 is used to distribute fiber optic service from a central office 22 to a plurality of subscriber/user locations 24. In the depicted embodiment, various fiber optic cables are routed underground to a plurality of hand holes 26 located in general proximity to the various locations of the subscriber locations 24.

The architecture 20 can include a feeder cable 28 including one or more optical fibers routed from the central office 22 to a fiber distribution hub 30. The fiber distribution hub 30 can include one or more optical splitters for splitting signals input from the feeder cable 28 and directing the split signals to a plurality of output cables 32. The output cables 32 can extend from the fiber distribution hub 30 into a hand hole 26A located beneath the fiber distribution hub 30. Each of the output cables 32 can be terminated with a hardened multi-fiber fiber optic connector 68 (e.g., a 12 fiber connector) located within the hand hole 26A. The hardened multi-fiber fiber optic connectors 68 can be connected to corresponding hardened multi-fiber fiber optic connectors 68 terminating a multi-fiber distribution cable 36 to provide optical couplings between the output cables 32 and the distribution cable 36. The distribution cable 36 is routed underground to a collector box 38 located at hand hole 26F. To reach hand hole 26F, the multi-fiber distribution cable 36 is routed through a series of intermediate hand holes 26B-26E and through a series of underground conduits 40 (only some shown) that extend between the hand holes.

The collector box 38 is preferably positioned at an intermediate one of the hand holes 26A-26K. From the collector box 38, a multi-fiber optic cable can be routed to a multi-service terminal 42 within the hand hole 26F. Additional cables can be routed in upstream and downstream directions from the hand hole 26F through the underground conduits 40 to multi-service terminals 42 positioned within hand holes 26B-26E and in hand holes 26G-26K. The multi-service terminals 42 provide connection locations for readily connecting fiber optic drop cables 46 to the remainder of the network. The drop cables 46 can extend from the multi service terminals 42 to network interface devices provided at the subscriber locations 24

Hardened outside plant fan-out devices 44 can be used to facilitate directing optical signals to two or more separate multi-service terminals 42 without needing to utilize a separate port on the collection box 38 for each of the multi-service terminals 42, It will be appreciated that the distribution architecture 20 is configured to facilitate rapid deployment of the network in the field. In this regard, rapid spooling technology can be incorporated into any of the various components (e.g., the fiber distribution hub 30, the collector boxes 38 and the multi-service terminals 42) of the distribution architecture 20. Moreover, rapid spooling technology can also be used in combination with patch cords routed between various components of the distribution architecture 20. Such rapid spooling technology allows fiber optic cables to be readily pulled through the underground conduits 40 from hand hole to hand hole.

To facilitate rapid deployment of the network, many of the system components/connectors are preferably pre-terminated at the factory and thereby equipped with plug-and-play technology that can reduce or eliminate the need for optical splicing in the field. During deployment of the network, field technicians can use such plug-and-play technology to readily interconnect the various components of the architecture 20. Such plug-and-play technology also allows the architecture 20 to be readily upgraded after deployment with minimal or no need for field splicing.

Figure 3:
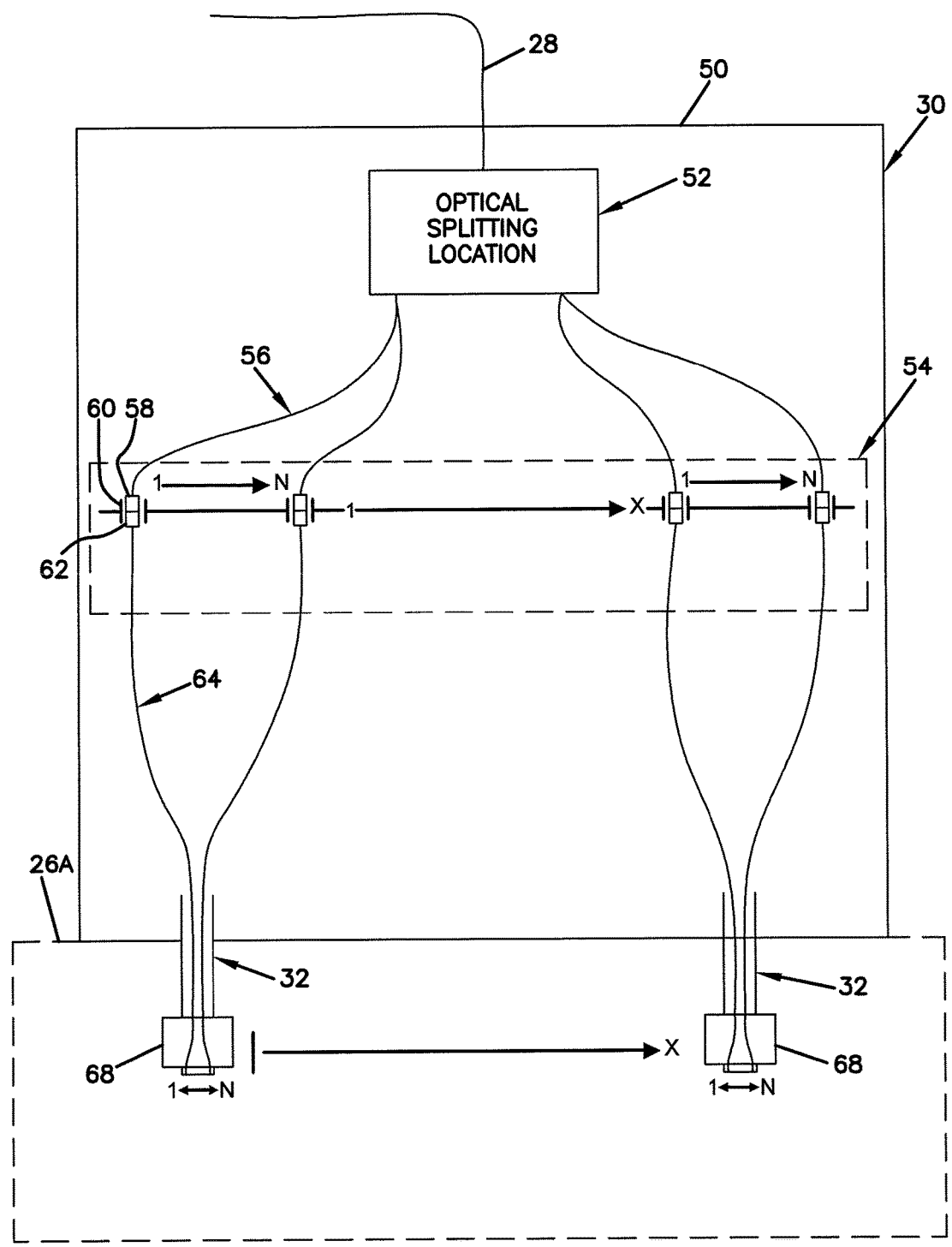
FIG. 3 is a schematic view of an example fiber distribution hub that can be used in the architecture of FIG. 2.

FIG. 3 is a schematic representation of the fiber distribution hub 30 of FIG. 2. As shown at FIG. 3, the fiber distribution hub includes an outer enclosure 50 (e.g., an environmentally sealed cabinet with one or more doors for accessing the interior of the cabinet) containing a splitter location 52 and a termination region 54. The splitter location 52 can include one or more splitter mounting positions for mounting optical splitter modules. The optical splitter modules can include optical splitters used to split input signals from the optical fibers of the feeder cable 28 to a plurality of connectorized pigtails 56. It will be appreciated that the splitters can provide any number of different split ratios (e.g., one to eight split ratio, one to sixteen split ratio, one to thirty two split ratio, etc.). The connectorized pigtails 56 include optical connectors 58 (e.g., SC connectors) that plug into fiber optic adapters 60 (e.g., SC fiber optic adapters) provided at the termination region 54. The fiber optic adapters 60 assist in coupling the optical connectors 58 to corresponding optical connectors 62 (e.g., SC connectors) terminating the ends of output pigtails 64. The output pigtails 64 are routed to the output cables 32 that extend out of the enclosure 50 into the hand hole 26A. Outer ends of the output cables 32 are terminated with the hardened multi-fiber optical connectors 68.

It will be appreciated that fiber distribution hubs of various sizes and fiber counts can be utilized. In one embodiment, fiber distribution hub 30 provides at least 288 terminations corresponding to 288 output fibers routed through the output cables 32. For ease of administration, the fibers can be organized in groups of fibers corresponding to the number of fibers terminated at each of the hardened multi-fiber optical connectors 68. For example, if the hardened multi-fiber optical connectors 68 each support 12 fibers, then the fiber optic adapters 60 at the termination region 54 can be arranged in sets of 12 with each set of 12 corresponding to a given one of the hardened multi-fiber optical connectors 68. In the case of a 288 fiber distribution hub, 24 sets of 12 fiber optic adapters can be provided at the termination region 54, and 24 twelve fiber output cables 32 each having a twelve fiber hardened multi-fiber optical connector 68 can be routed out of the enclosure 50.

The hardened multi-fiber optical connectors 68 are preferably adapted for outside environmental use. In this regard, hardened multi-fiber optical connectors 68 can include one or more environmental seals for preventing moisture intrusion into the connector 68. Additionally, the hardened multi-fiber optical connectors 68 can include robust fasteners (e.g., threaded fasteners) capable of withstanding relatively large tensile loads. Further details relating to the fiber distribution hub 30 can be found at U.S. Provisional Patent Application Ser. No. 61/310,214 that is hereby incorporated by reference in its entirety.

Figure 4:
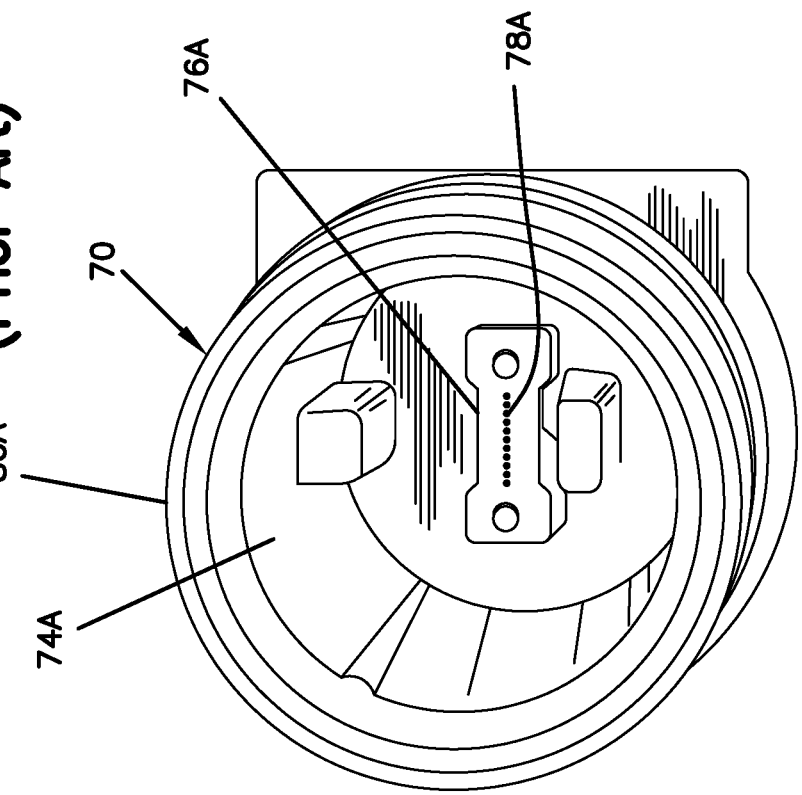
FIG. 4 illustrates an example hardened multi-fiber optical plug that can be used in the architecture of FIG. 2.
Figure 5:
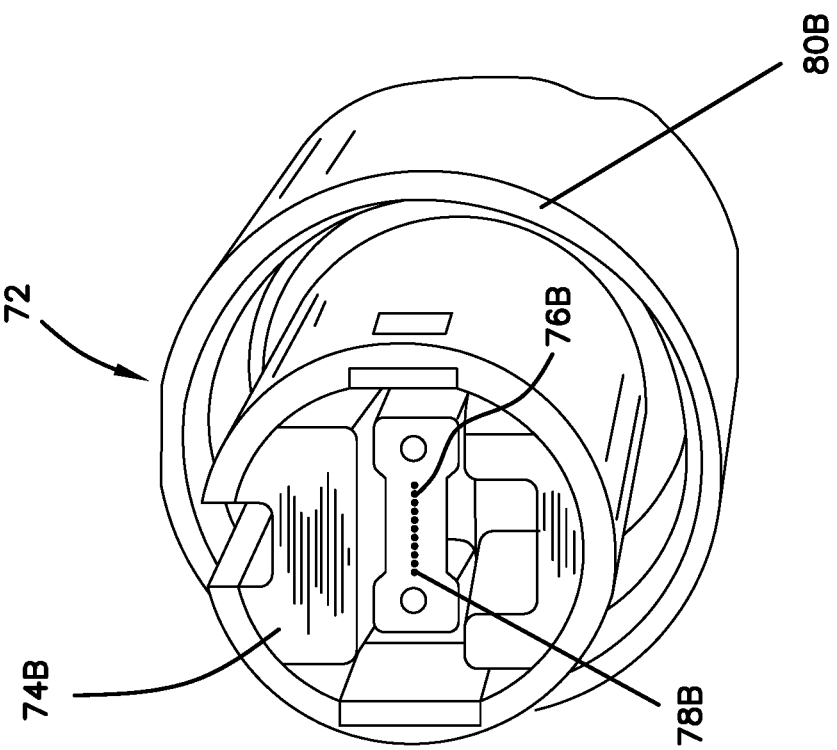
FIG. 5 illustrates a hardened multi-fiber optical jack that can be used in the architecture of FIG. 2.

In certain embodiments, hardened multi-fiber optical connectors 68 can be either hardened multi-fiber jacks or hardened multi-fiber plugs. FIG. 4 shows an example of hardened multi-fiber optical plug 70 and FIG. 5 shows a corresponding hardened multi-fiber optical jack 72. The plug 70 and the jack 72 are adapted to be mechanically and optically coupled together. The hardened multi-fiber optical plug 70 includes a housing assembly 74A supporting a multi-fiber ferrule 76A supporting the ends of a plurality of optical fibers 78A (e.g., 12 fibers). An externally threaded coupling nut 80A is mounted on the housing assembly 74A. The hardened multi-fiber optical jack 72 includes a housing assembly 74B. A multi-fiber ferrule 76B is supported within the housing assembly 74B. The multi-fiber ferrule 76B supports a plurality of optical fibers 78B. An internally threaded coupling nut 80B is mounted on the housing assembly 74B. When the hardened multi-fiber optic plug 70 and the hardened multi-fiber optic jack 72 are connected together, the housing assembly 74A mates with the housing assembly 74B, and the multi-fiber ferrule 76A connects with the multi-fiber ferrule 76B such that the optical fibers 78A, 78B are aligned with one another and optically connected to one another. The coupling nuts 80A, 80B are threaded together to provide a secure mechanical connection between the optical plug 70 and the optical jack 72.

One or more environmental seals can be provided between the housing assemblies 74A, 74B to prevent water intrusion into the optical plug 70 and the optical jack 72 when the components are coupled together. Further details about the hardened multi-fiber optical plug 70 and the hardened multi-fiber optical jack 72 can be found in U.S. Pat. No. 7,264,402 to Theuerkorn et al., the disclosure of which is hereby incorporated by reference herein in its entirety.

Figure 6:
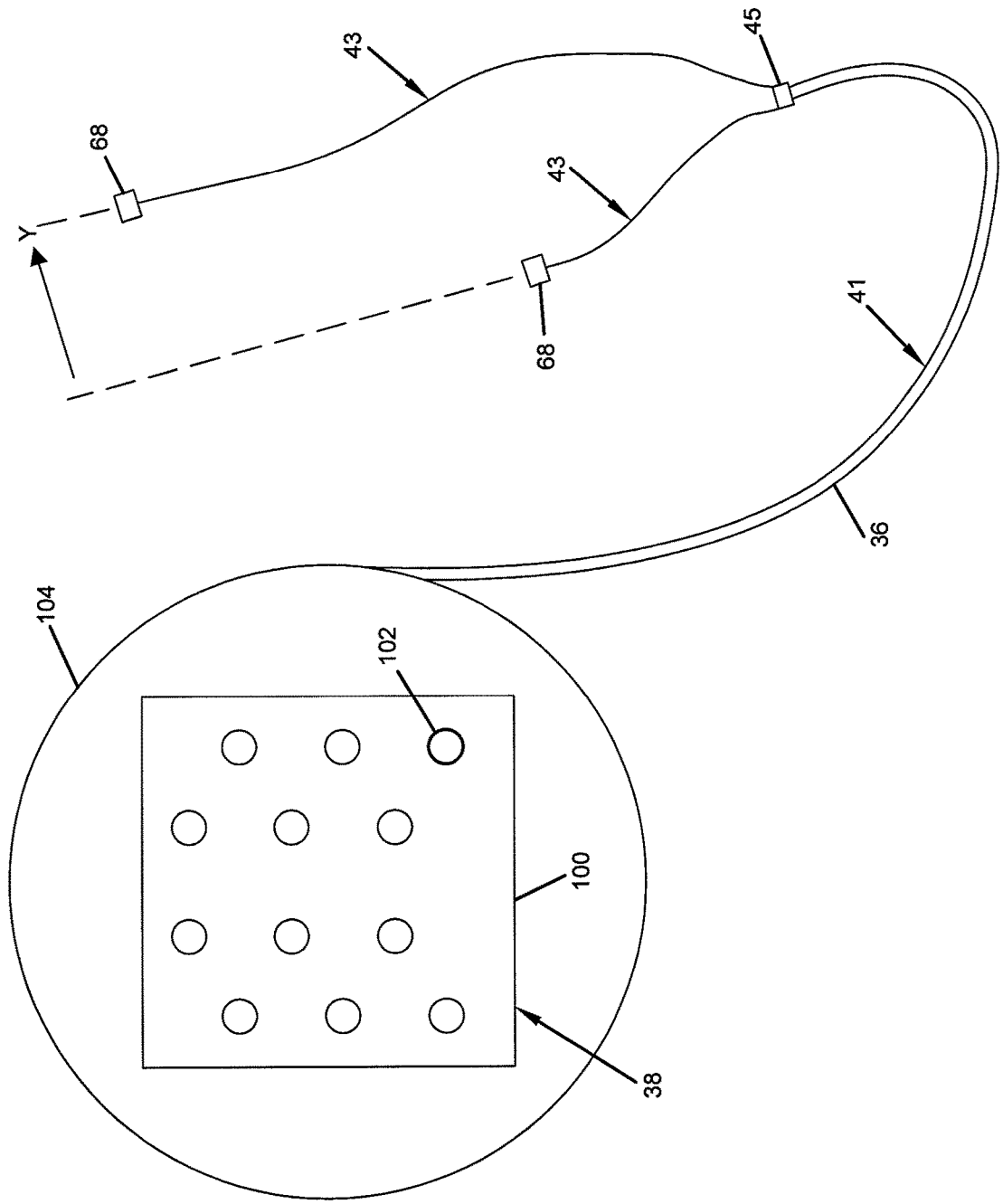
FIG. 6 illustrates a collector box that can be used in the architecture of FIG. 2.

FIG. 6 schematically illustrates the collector box 38 of the distribution architecture 20. The collector box 30 includes a housing 100 that is preferably environmentally sealed. A plurality of ports 102 are provided on the housing 100. The ports 102 are preferably configured to provide optical connections with hardened multi-fiber optical connectors 68 (e.g., hardened multi-fiber optic plug 70 or hardened multi-fiber optic jack 72). In certain embodiments, the ports 102 can comprise hardened multi-fiber optical jacks 72 configured to receive hardened multi-fiber optical plugs 70. In alternative embodiments, the ports 102 can include converters having exterior ends adapted to receive a hardened multi-fiber optical plug or hardened multi-fiber optical jack, and interior ends adapted to receive standard non-hardened multi-fiber optical connectors (e.g., MPO/MTP connectors). An example non-hardened multi-fiber optical connector is disclosed at U.S. Pat. No. 5,214,730 to Nagasawa et al., that is hereby incorporated by reference herein in its entirety. An example converter that can be used at the ports 102 is disclosed at U.S. Patent Application Publication No. US2008/0226235 A1, that is hereby incorporated by reference herein in its entirety.

The ports 102 provide connection locations whereby multi-fiber optical connectors located within the housing 100 can be optically connected to multi-fiber optical connectors located outside of the housing 100. When interface converters are used at the ports 102, the multi-fiber optical connectors located within the housing 100 can be non-hardened (e.g., standard MPO connectors) and the multi-fiber optical connectors received within the ports 102 from outside the housing 100 can be hardened (e.g., hardened multi-fiber optical plugs 70 or hardened multi-fiber optical jacks 72). In other embodiments, hardened multi-fiber optical plugs 70 or hardened multi-fiber optical jacks 72 can be mounted directly to the housing 100 at the ports 102 thereby providing connection locations whereby corresponding hardened multi-fiber optical plugs/hardened multi-fiber optical jacks can interface with the housing 100.

Figure 7:
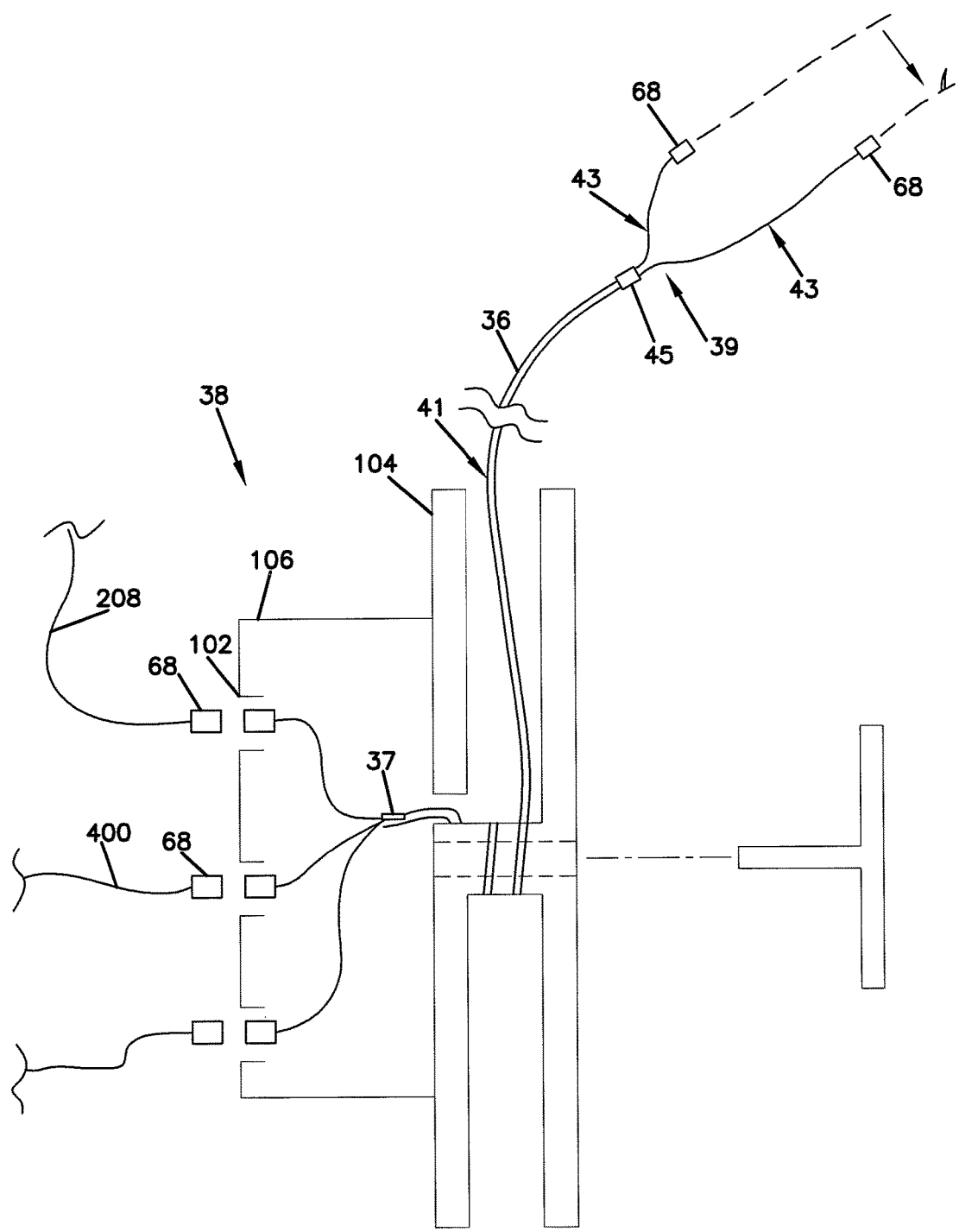
FIG. 7 is another view of the collector box of FIG. 6.

Referring to FIGS. 6 and 7, a spool 104 can be mounted to the housing 100. Multi-fiber optic cable 36 can be coiled about the spool 104. In one embodiment, the multi-fiber optic cable 36 includes 144 fibers and the housing 100 includes 12 ports with 12 of the optical fibers being routed to each of the 12 ports. In other embodiments, more or fewer ports can be provided. For example, in another embodiment, a 72 fiber optical cable can be utilized and the housing 100 can include 6 active ports each accommodating 12 of the optical fibers of the fiber optic cable.

The multi-fiber optical cable 36 has a first end 37 that is routed from the spool 104 into the interior of the housing 100. Within the housing 100, the optical fibers of the fiber optic cable 36 are fanned out and directed in groups to each of the ports 102. The fibers within the housing 100 can be terminated with a standard MTP connector if interface converters are utilized at the ports 102. Alternatively, the fibers within the housing 100 can be terminated with hardened multi-fiber optical plugs or hardened multi-fiber optical jacks provided at the ports 102.

The multi-fiber optic cable 36 can also include a second end 39 at which a plurality of hardened multi-fiber optical connectors 68 are terminated. In certain embodiments, the number of hardened multi-fiber optical connectors 68 provided at the second end of the multi-fiber optic cable 36 equals the active number of ports provided at the housing 100 (e.g., Y connectors 68 and Y corresponding active ports are provided). For example, in the case of a 144 fiber cable 36, twelve ports each accommodating 12 fibers are provided at the housing 100 and twelve hardened multi-fiber optical connectors 68 each supporting 12 optical fibers are provided at the second end 39 of the cable. The cable 36 includes a main body portion 41 and a plurality of broken-out portions 43 (i.e., fanned out portions or divided portions) to which the connectors 68 are terminated. A break-out/fan-out block 45 is provided at the interface between the main body portion 41 and the broken-out portions 43. Tensile strength members within jackets of the broken out portions 43 can be secured to the connectors 68 and the break-out block 45. Tensile strength members of the main body portion 41 can be secured to the block 45 and the housing 100.

Figure 8:
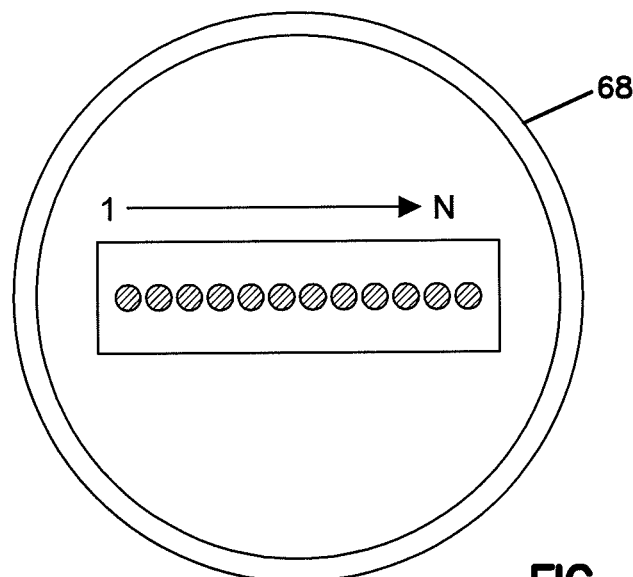
FIG. 8 is a schematic view of an end of a twelve fiber version of a hardened multi-fiber optic connector used in the architecture of FIG. 2.
Figure 9:
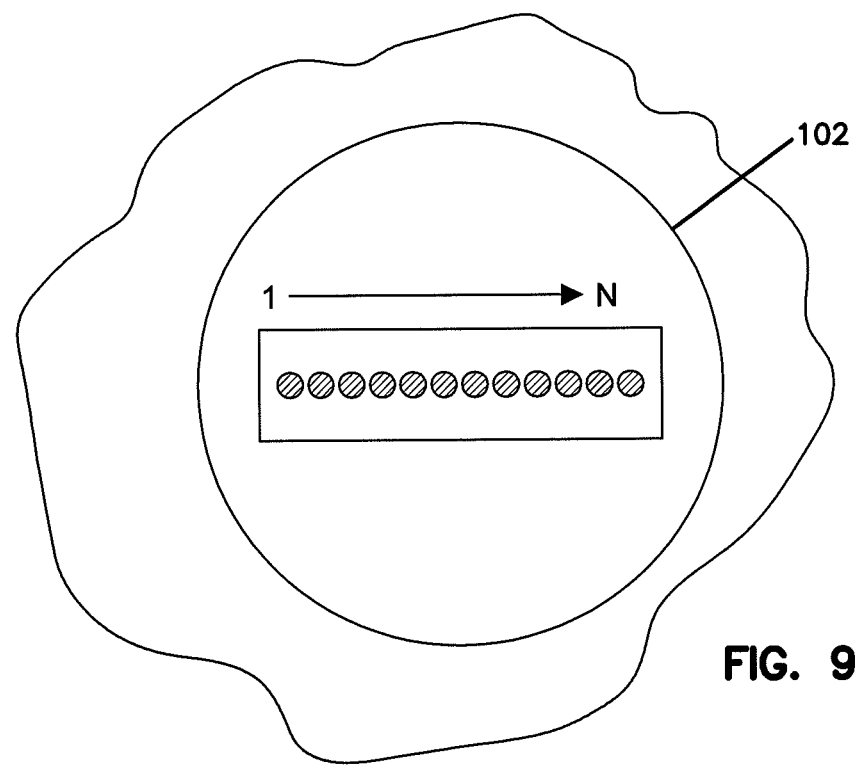
FIG. 9 is a schematic view of a port of the collector box of FIGS. 6 and 7.

The hardened multi-fiber optical connectors 68 of the cable 36 are adapted to optically connect with the hardened multi-fiber optical connectors terminating the output cables 32 of the fiber distribution hub 30. In certain embodiments, the hardened multi-fiber fiber optic connectors 68 provided at the second end of the multi-fiber optical cable 36 can be hardened multi-fiber optic plugs 70 or hardened multi-fiber optic jacks 72. FIG. 8 is a schematic view of an end of a twelve fiber version of one of the hardened multi-fiber optic connectors provided at the second end of the multi-fiber fiber optic cable 36. FIG. 9 is a schematic view of one of the ports 102 of the connector housing 100. The port 102 is shown providing connection locations for twelve fibers.

In use of the collector box 38, the collector box 38 can initially be placed in the desired hand hole (e.g., hand hole 26F). Once in the hand hole, the collector box 38 can be mounted on a spindle 106 within the hand hole. Thereafter, the multi-fiber optical cable 36 can be pulled from the hand hole 26F through the underground conduits 40 to the hand hole 26A where the hardened multi-fiber optic connectors 68 of the cable 36 are coupled to the hardened multi-fiber optical connectors 68 of the output cables 32 extending from the fiber distribution hub 30. To route the multi-fiber fiber optic cable 36 through the conduit 40, the second end 39 of the cable 36 can be connected to a pulling line used to pull the cable through the conduits 40. The hardened multi-fiber optical connectors 68 of the cable 36 can be arranged in a staggered configuration to facilitate passing the connectors through the conduit. For example, as shown at FIGS. 6 and 7, the break-out cable portions extending from the break-out block 45 have different lengths thereby allowing for staggering of the hardened multi-fiber optical connectors 68.

When the second end of the multi-fiber fiber optic cable 36 is pulled through the conduit 40, the spool 104 and the housing 100 with the ports 102 spin in unison about the spindle 106 thereby allowing the multi-fiber fiber optic cable 36 to be paid off from the spool 104.

The multi-service terminals 42 provide connection locations for connecting subscribers to the distribution architecture 20. Typically, drop cables 46 having single optical fibers are routed between the multi-service terminals 42 and the subscriber locations 24. The multi-service terminals 42 include housing 202 that are preferably environmentally sealed. The housings 202 include ports 204 at which the drop cables 46 can be connected to the distribution architecture 20. In certain embodiments, spools 206 can be mounted to the housings 202. It will be appreciated that multi-service terminals can be provided with different number of active ports. For example, 4-port, 6-port, 8-port and 12-port multi-service terminals can be used.

Figure 10:
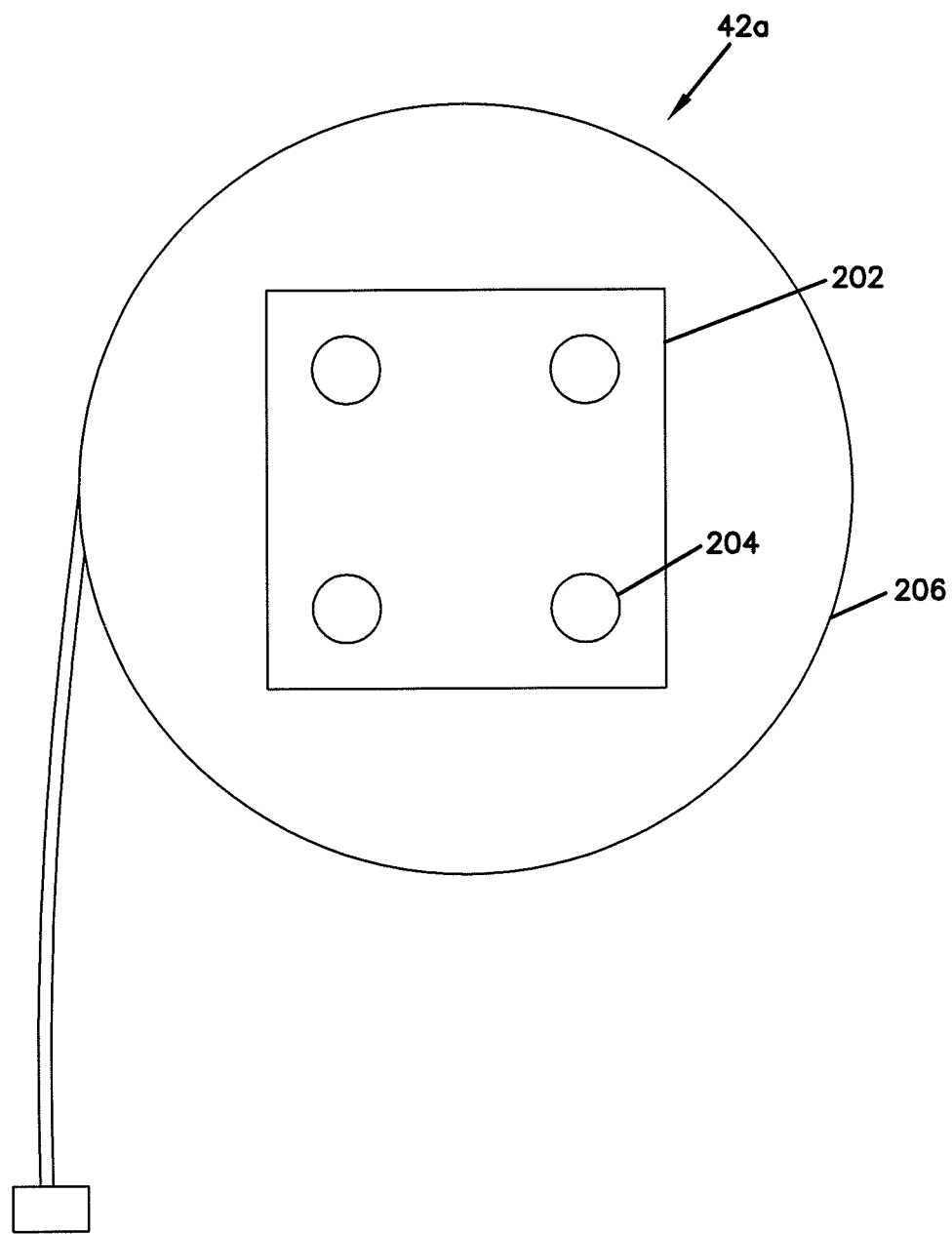
FIGS. 10 and 11 show an example four port multi-service terminal that can be used in the architecture of FIG. 2.
Figure 11:
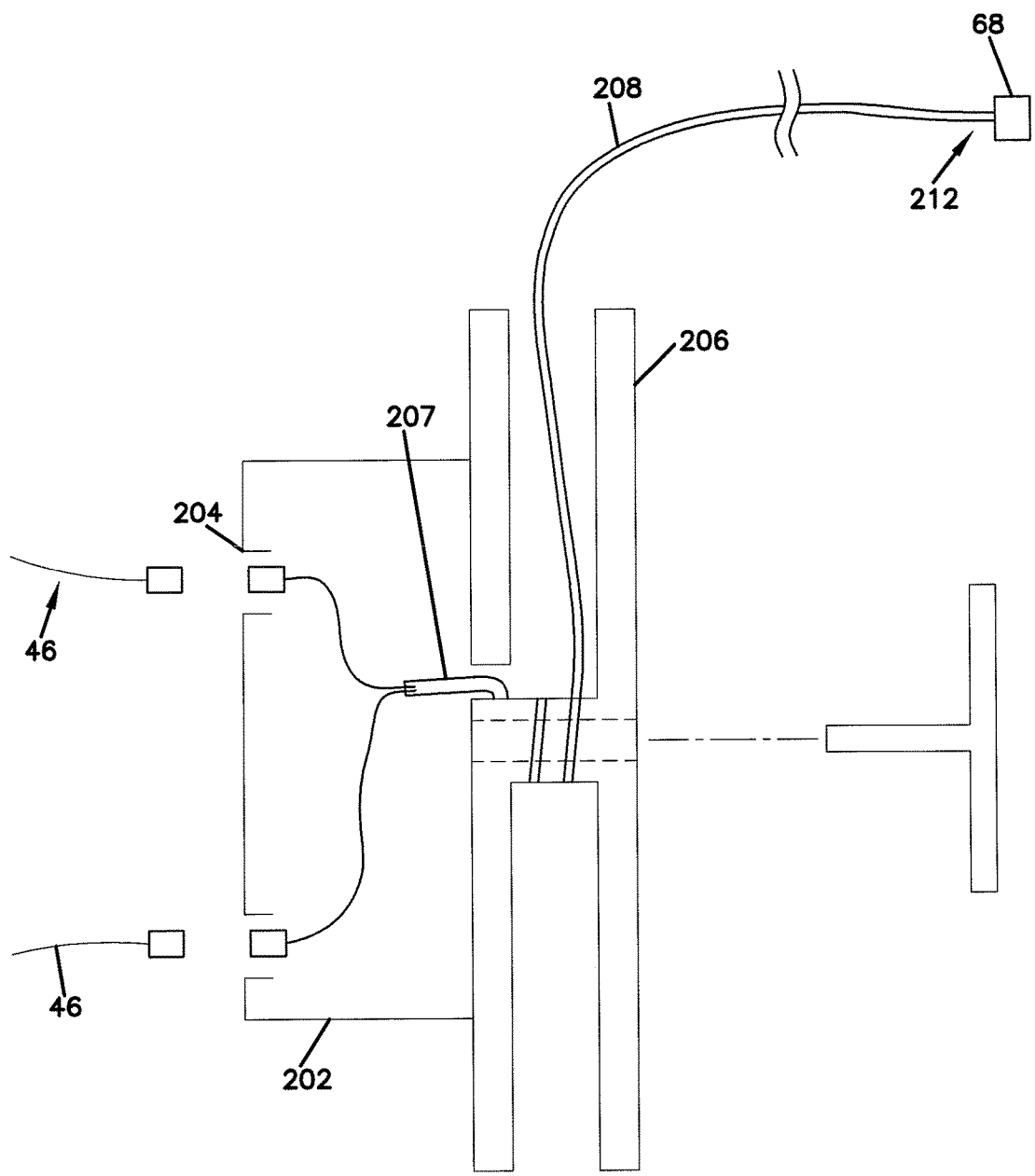
Figure 13:
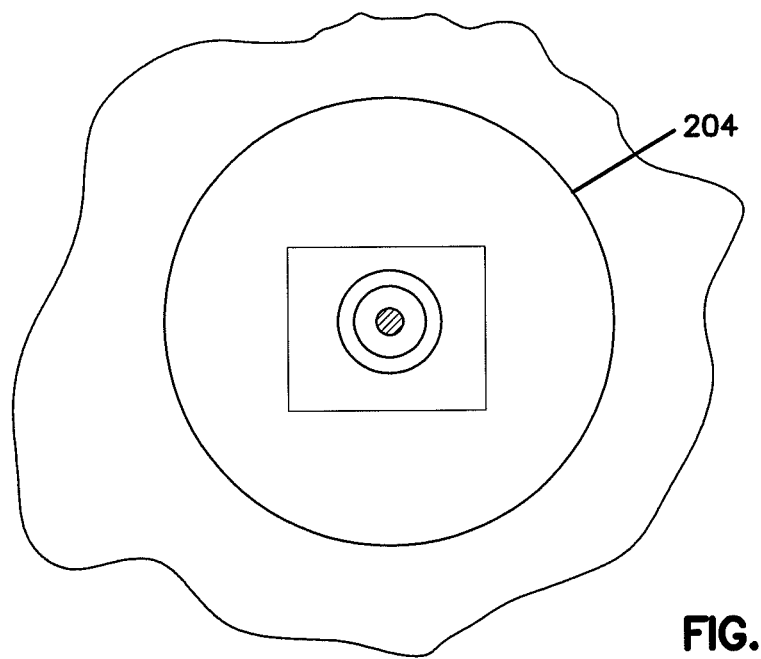
FIG. 13 illustrates an example port of the multi-service terminal of FIGS. 10 and 11.

FIGS. 10 and 11 show an example four port multi-service terminal 42a. The terminal 42a includes a housing 202 that is preferably environmentally sealed. A plurality of ports 204 configured to interface with single-fiber fiber optic connectors are provided on the housing 202. A spool 206 is also connected to the housing 202. A multi-fiber optical cable 208 is coiled about the spool 206. A first end 207 of the multi-fiber optical cable 208 extends from the spool 206 into the interior of the housing 202. Within the interior of the housing 202, the optical fibers of the multi-fiber optical cable 208 are fanned out and routed to the ports 204. In the depicted embodiment, single fibers are routed to each of the ports 204. The ports 204 can include interior ends adapted for receiving non-hardened fiber optic connectors (e.g., SC connectors). The non-hardened fiber optic connectors can be positioned within the housing 202 and can include ferrules supporting the ends of the fanned-out optical fibers within the housing 202. Outer ends of the ports 204 (see FIG. 13) can be configured to receive hardened single fiber optical connectors 210 corresponding to the drop cables 46. Examples of hardened single fiber optical connectors are disclosed at U.S. Pat. Nos. 6,648,520; 7,090,407; and 7,744,288 which are hereby incorporated by reference herein in their entireties.

Figure 12:
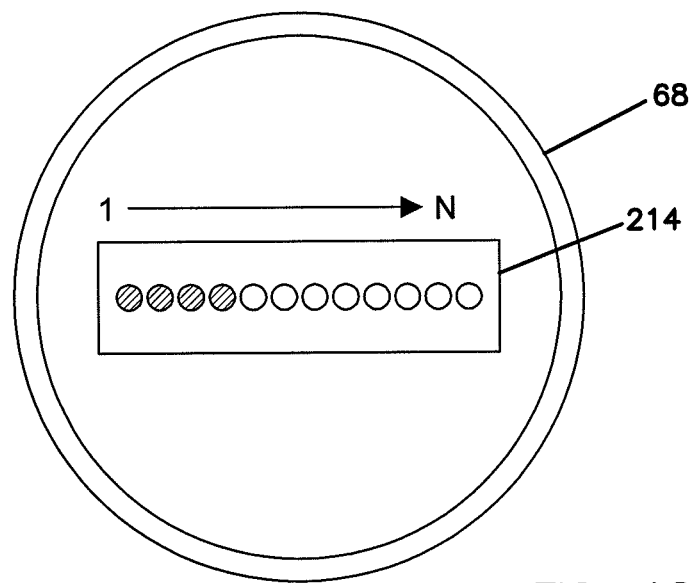
FIG. 12 is an end view of a hardened multi-fiber connector used with the multi-service terminal of FIGS. 10 and 11.
Figure 14:
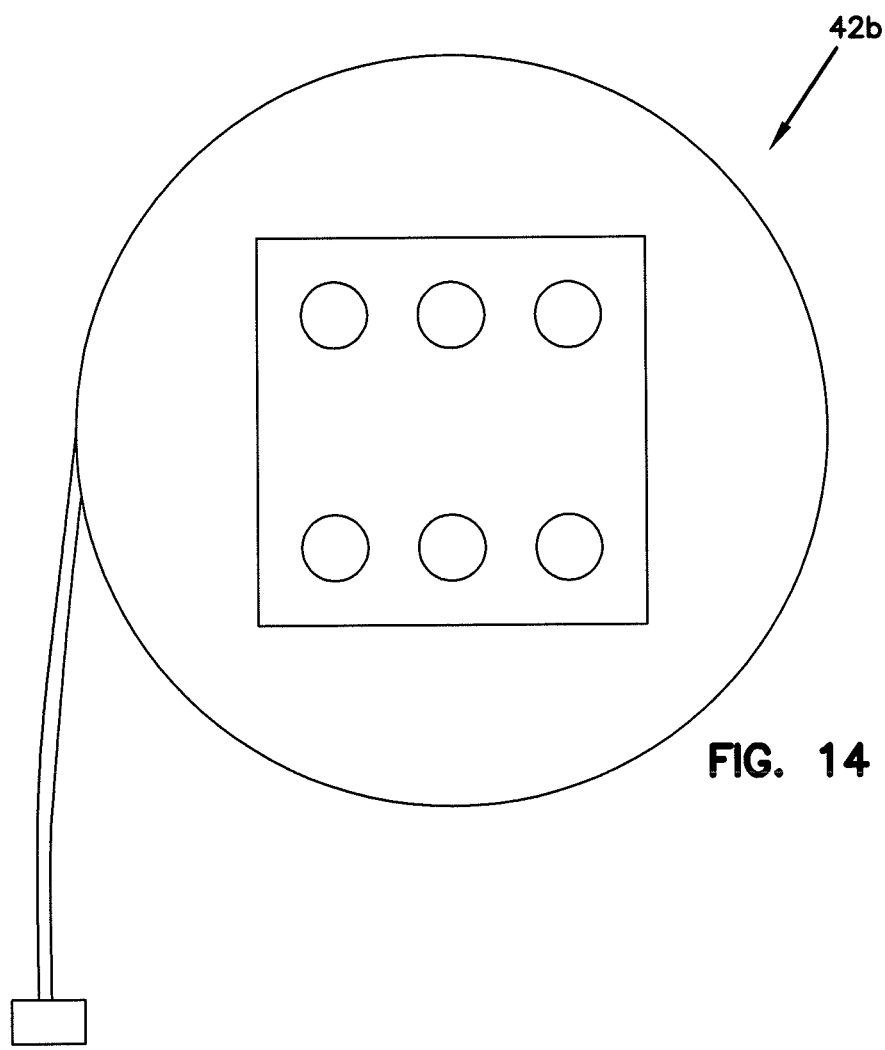
FIG. 14 illustrates a six port multi-service terminal that can be used in the architecture of FIG. 2.
Figure 15:
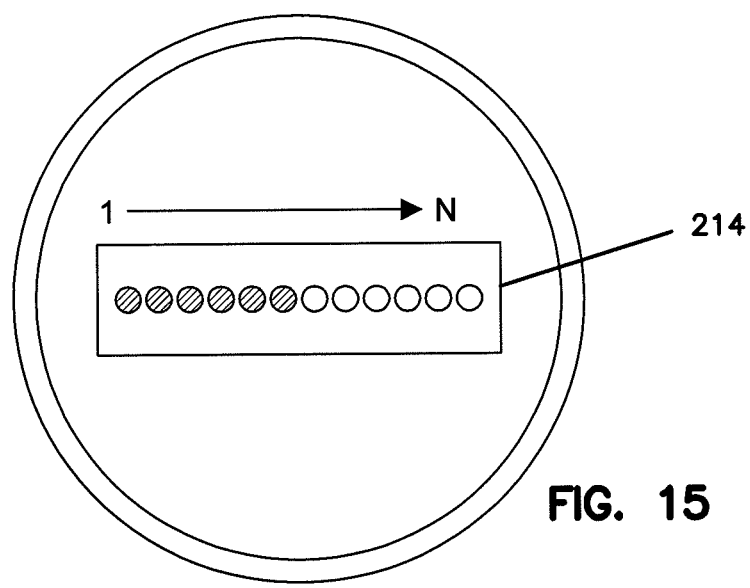
FIG. 15 is an end view of a multi-fiber optical connector of the multi-service terminal of FIG. 14.
Figure 16:
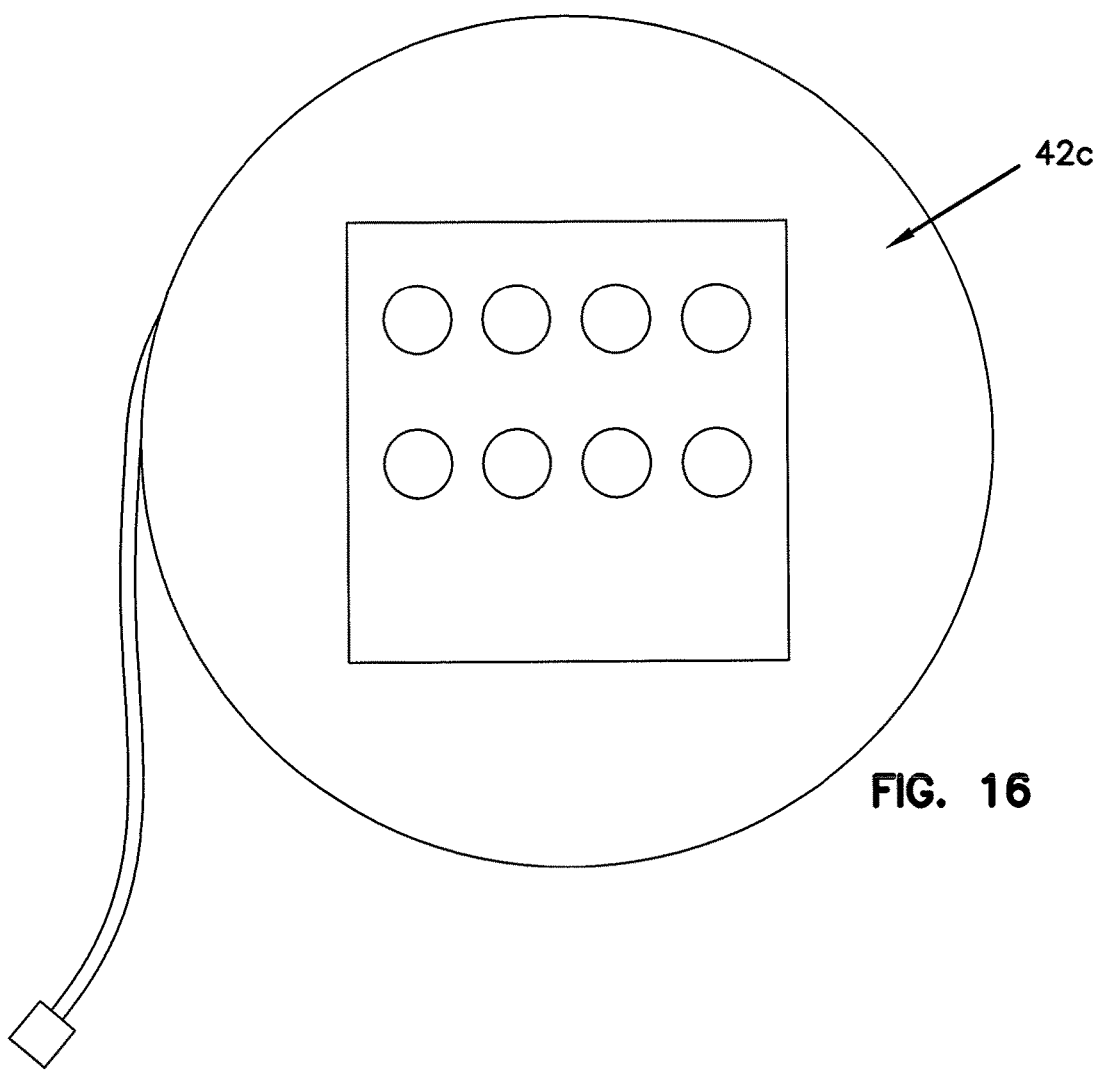
FIG. 16 shows an eight port multi-service terminal that can be used in the architecture of FIG. 2.
Figure 17:
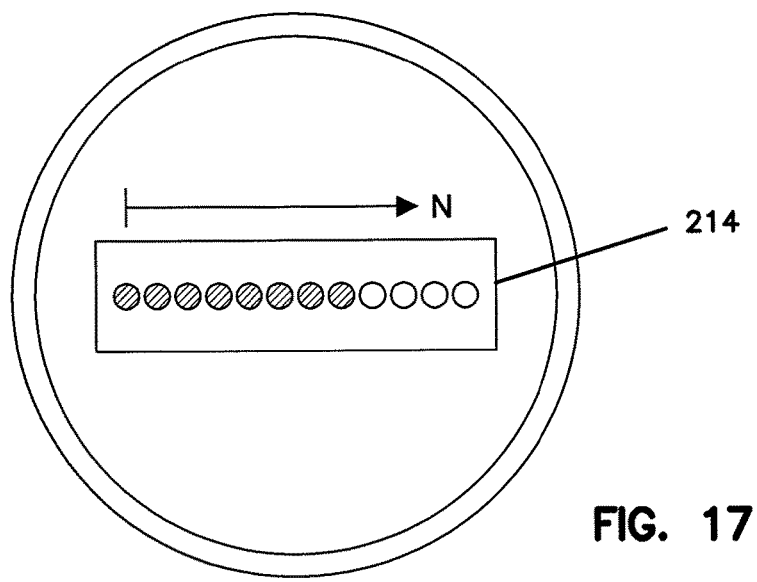
FIG. 17 is an end view of a multi-fiber optical connector that can be used with the multi-service terminal of FIG. 16.
Figure 18:
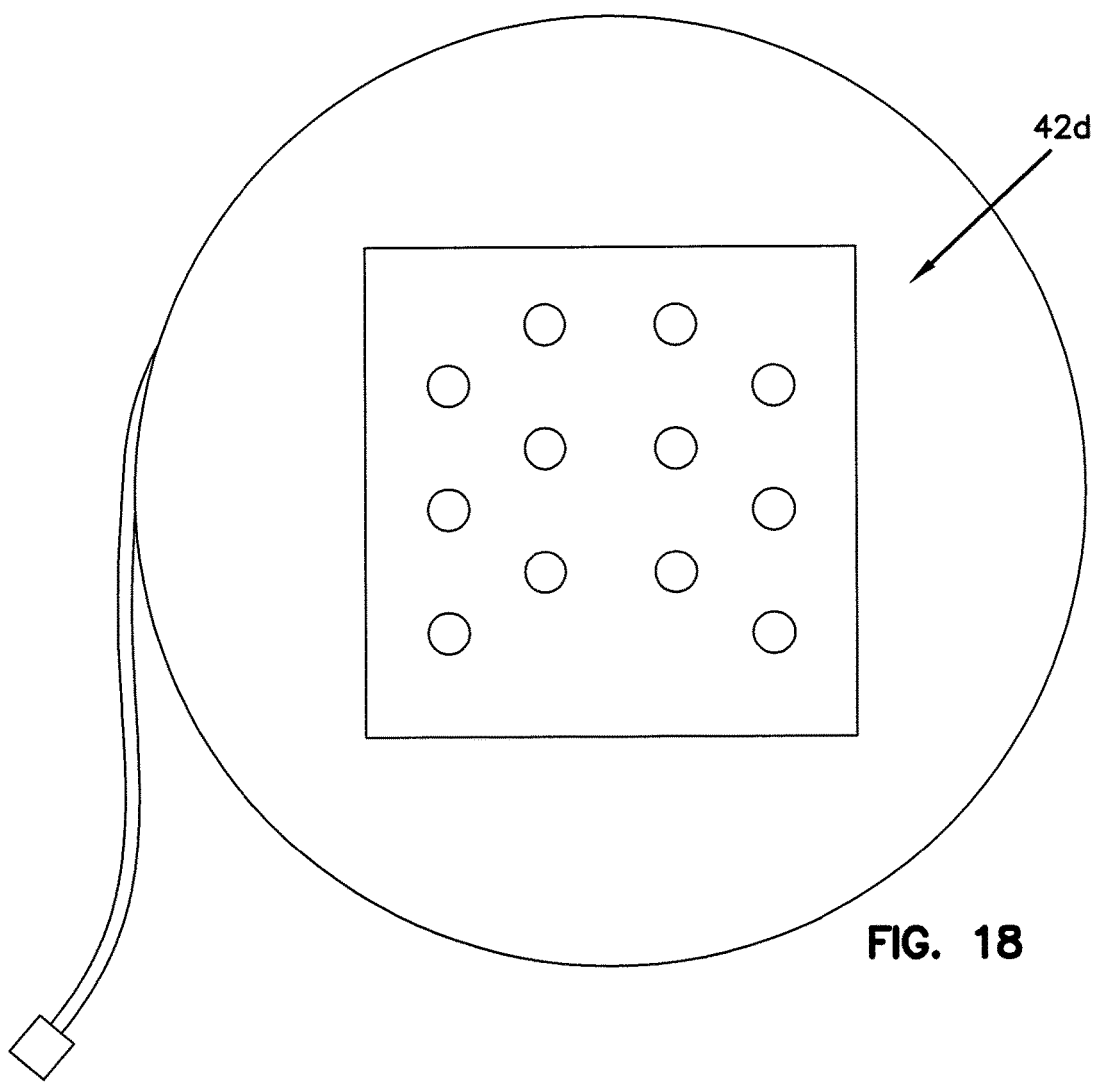
FIG. 18 shows a twelve port multi-service terminal that can be used with the architecture of FIG. 2.
Figure 19:
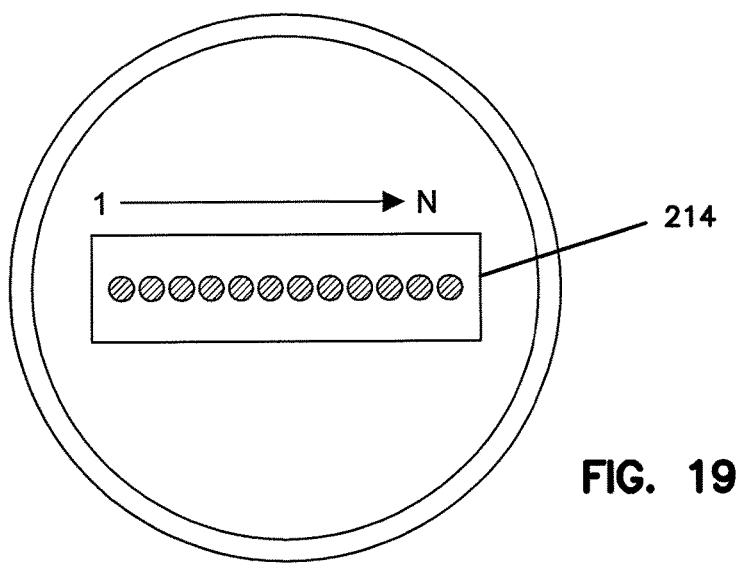
FIG. 19 is an end view of a multi-fiber optical connector that can be used with the multi-service terminal of FIG. 18.

A second end 212 of the multi-fiber fiber optic cable 208 is terminated by a hardened multi-fiber optical connector 68 (e.g., a hardened multi-fiber optical plug 70 or a hardened multi-fiber optical jack 72). FIG. 12 shows an end view of the hardened multi-fiber optical connector 68. The hardened multi-fiber optical connector 68 includes a ferrule 214 defining twelve fiber positions (e.g., holes for receiving and supporting fibers therein). The fiber positions are numbered consecutively one through twelve. In the case of a 4-port multi-service terminal, positions 1-4 of the ferrule 214 will receive and support active fibers routed to corresponding ports 1-4 of the multi-service terminal. In the case of a six port multi-service terminal 42b (see FIGS. 14 and 15), positions 1-6 of the ferrule 214 will receive active fibers corresponding to the ports 1-6 of the terminal. In the case of an eight port terminal 42c (see FIGS. 16 and 17), positions 1-8 of the ferrule 214 will receive fibers corresponding to ports 1-8 of the terminal. In the case of a twelve port terminal 42d (see FIGS. 18 and 19), all twelve positions of the ferrule 214 will receive active fibers corresponding to the twelve ports of the terminal.

To deploy a multi-service terminal within the distribution architecture 20, the terminal is positioned within the hand hole in which it is desired to locate the terminal. The second end 212 of the cable 208 is then pulled through the conduit 40 to a desired connection location where the hardened multi-fiber optical connector 68 can be connected to the distribution architecture 20. A spindle structure can be utilized to allow the spool 200, the housing 202 and the ports 204 to spin in unison about a common axis as the multi-fiber fiber optic cable 208 is paid off from the spool 206. The second end 212 of the multi-fiber optical cable 208 can be pulled back all the way to the collector box 38, or it can be pulled to an intermediate location between the multi-service terminal location and the collector box 38. If the second end 208 of the cable 208 is pulled all the way back to the collector box 38, the hardened multi-fiber fiber optic connector 68 can be plugged into a port 102 of the collector box 38 to provide optical connections therewith. After a sufficient length of the cable 208 has been paid off from the spool 206, the hardened single fiber connectors of the drop cables 46 can be plugged into the ports 204 of the multi-service terminal. In this way, the subscriber locations are connected to the overall network.

In certain embodiments, the hardened outside plant fan-out devices 44 can be installed at locations between the multi-service terminals 42 and the collector boxes 38 of the distribution architecture 20. FIG. 20 shows a hardened outside plant fan-out device 44A having a 3-way fan-out configuration. The fan-out device 44A includes a 12-fiber cable 300 terminated at one end by a hardened multi-fiber optic connector 68. As shown at FIG. 23, the hardened multi-fiber optical connector 68 includes a ferrule 302 supporting all twelve fibers of the cable 300. The device 44A also includes a fan-out block 304 in which the 12 fibers of the cable 300 are fanned out into three groups of four fibers that form fanned-out cable portions 306. As shown at FIGS. 21 and 22, both the main cable 300 and the fanned-out cable portions 306 can include tensile reinforcing structures 305 and outer jackets 307. The tensile reinforcing structures can be anchored to the fan-out block 304 and to the connectors 68. The fanned-out cable portions 306 are terminated by multi-fiber fiber optic connectors 68. As shown at FIG. 24, the fibers of the fanned out portions occupy positions 1-4 of the ferrules 302 of the multi-fiber fiber optic connectors 68. Positions 5-12 of the hardened multi-fiber fiber optic connectors are not utilized for active fibers. It will be appreciated that the fan-out device 44A is adapted for distributing signals from the collector box 38 to three separate 4-port multi-service terminals.

Figure 25:
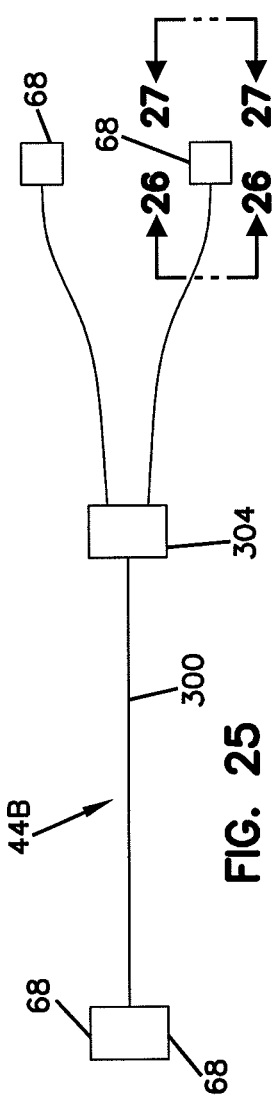
FIG. 25 shows an alternative hardened outside plant fan-out device that can be used in the architecture of FIG. 2.
Figure 26:
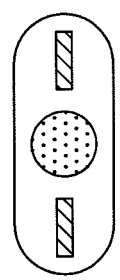
FIG. 26 is a cross-sectional view taken along section line 26-26 of FIG. 25.
Figure 27:
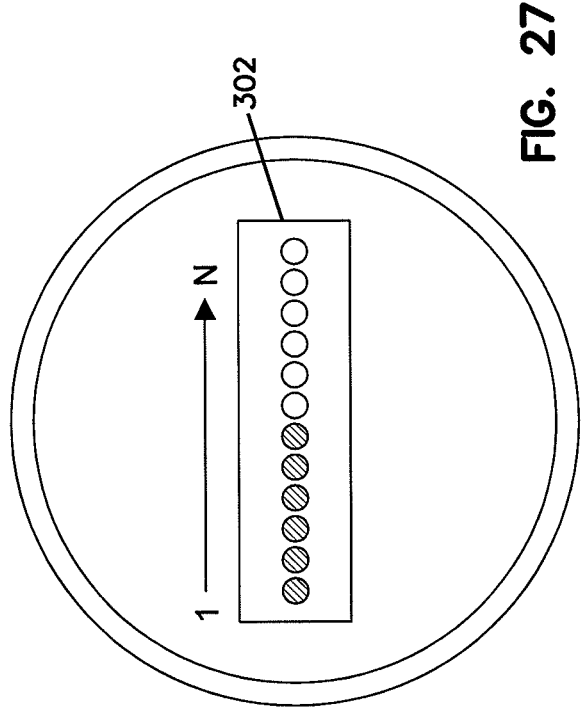
FIG. 27 is a cross-sectional view taken along section line 27-27 of FIG. 25.

FIG. 25 shows an alternative hardened outside plant fan-out device 44B having the same configuration as the fan-out device 44A except the 12 fibers are fanned out into two fanned-out cable portions each including six of the fibers (see FIG. 26). The fanned-out cable portions are terminated by hardened multi-fiber fiber optic connectors 68. As shown at FIG. 27, the fibers occupy positions 1-6 of the ferrule of the hardened multi-fiber fiber optic connectors 68. The fan-out device 44B is adapted for distributing signals from the collector box 38 to two separate 6-port multi-service terminals.

Figure 28:
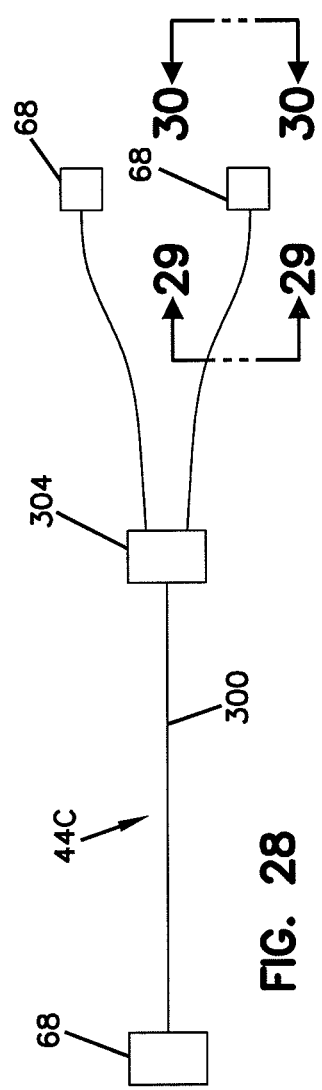
FIG. 28 shows a further hardened outside plant fan-out device that can be used in the architecture of FIG. 2.
Figure 30:
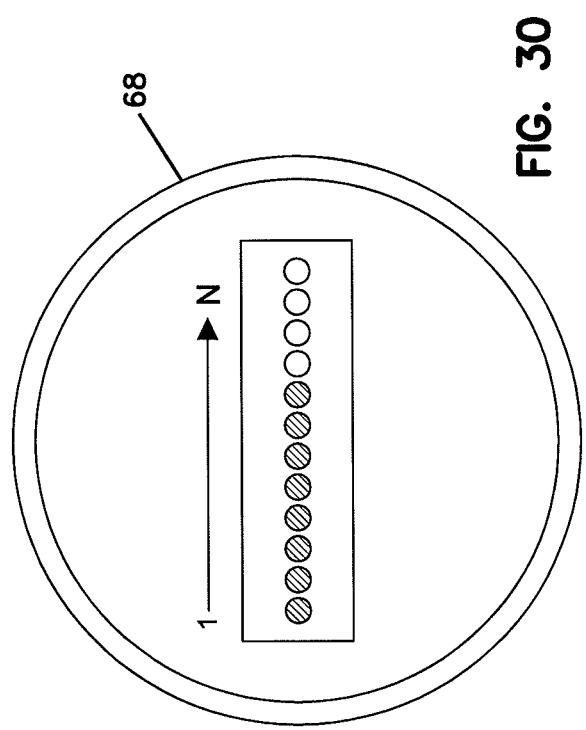
FIG. 30 is a cross-sectional view taken along section line 30-30 of FIG. 28.
Figure 29:
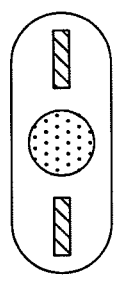
FIG. 29 is s cross-sectional view taken along section line 29-29 of FIG. 28.

FIG. 28 shows a further hardened outside plant fan-out device 44C in accordance with the principles of the present disclosure. The fan-out device 44C has the same construction as the fan-out device 44B except the fibers are not fanned out uniformly between the two fanned out cable portions. Instead, one of the fanned cable portions includes 8 fibers (see FIG. 29) while the other includes 4 fibers (similar to FIG. 22). The fanned out cable portion with 4 fibers is terminated by hardened multi-fiber fiber optic connector 68 and the fibers occupy positions 1-4 (as shown at FIG. 24) of the connector 68. This hardened multi-fiber fiber optic connector is adapted to interface with a 4-port multi-service terminal. The other fanned out cable portion is terminated by hardened multi-fiber optical connector 68 and the 8 fibers of the fanned out cable portion occupy positions 1-8 of the ferrule of the connector (see FIG. 30). This connector is adapted to interface with an 8-port multi-service terminal.

In certain embodiments, hardened outdoor patch cords can be used within the distribution architecture to facilitate making upgrades. For example, in certain embodiments, rapid patch cords can be used in place of the spools on the multi-service terminals. In such embodiments, the multi-fiber optical cables 208 exiting the multi-service terminals constitute relatively short tethers that are connectorized by a hardened multi-fiber fiber optic connector 68. Due to the short length of the tether, it need not be coiled around a spool. A rapid patch cord can be used to provide an optical connection between the tether and another structure. For example, the rapid patch cord can be used to connect the tether directly to the collection box 38 or it can be used to connect the tether to an intermediate hardened outside plant fan-out device 44 positioned between the collection box 38 and the multi-service terminal. Additionally, rapid outside patch cables can also be used to provide connections between the collection box 38 and one of the hardened outside plant fan-out devices 44.

Figure 31:
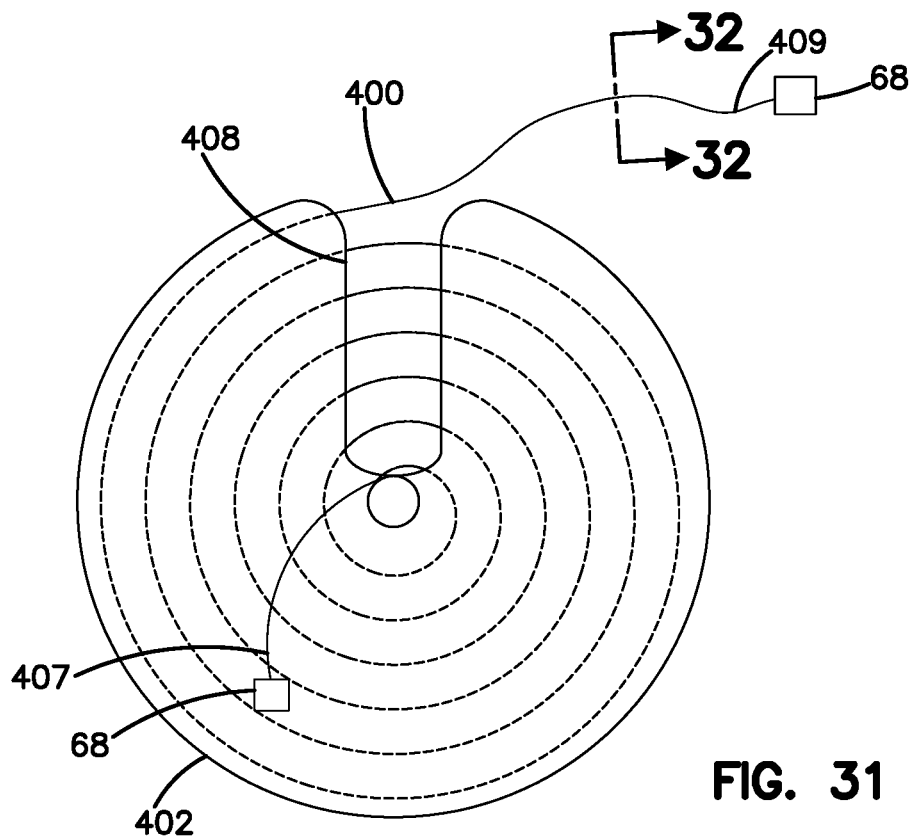
FIG. 31 illustrates an example rapid outdoor patch cord assembly that can be used in the architecture of FIG. 2.
Figure 32:
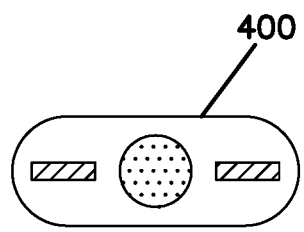
FIG. 32 is a cross-sectional view taken along section line 32-32 of FIG. 31.

FIGS. 31 and 32 show an example rapid outdoor patch cord assembly including a multi-fiber cable 400 (e.g., a 12-fiber multi-fiber cable) coiled around a spool 402. Hardened multi-fiber fiber optic connectors 68 are mounted at opposite ends of the cable 400. In a preferred embodiment, each of the hardened multi-fiber fiber optic connectors 68 includes a ferrule having 12 positions in which end portions of the optical fibers of the cable 400 are secured. In certain embodiments, the cable 400 as well as the cables used to for the main body and fanned-out portions of the outside plant fan-out device can have a construction of the type described in U.S. patent application Ser. No. 12/607,748 which is hereby incorporated by reference herein in its entirety.

The hardened multi-fiber fiber optic connector 68 positioned at a first end 407 of the cable 400 can be secured to a flange of the spool 402. The cable 400 is spooled around a drum 406 of the spool. A slot 408 in the flange of the spool allows the first end of the cable to be routed to an outside of the flange where the connector 68 is secured. A second end 409 of the cable 400 is located at the outside diameter defined by the cable wrapped about the spool.

To deploy the patch cable 400, the spool 400 is mounted adjacent to a desired connection location (e.g., in a hand hole adjacent to n multi-service terminal, a collector box or a hardened outside plant fan-out device). The spool 402 can be mounted on a spindle or another structure for allowing the spool to spin. Thereafter, the second end 409 of the cable 400 is pulled causing the spool 402 to spin and cable to be paid off from the spool 402. The second end 409 is pulled through the underground conduits 40 and any intermediate hand holes to a second desired mounting location. Once sufficient cable length has been paid off from the spool 402 to allow for the desired connection, any remaining cable on the spool can be cable tied and removed from the spool 402 thereby allowing the spool itself to be disposed of. The connectorized ends of the patch cable can then be plugged into the desired connection locations to provide an optical patch there between.

Further details about an example outdoor spool that can be used in accordance with the principles of the present disclosure are disclosed at Application Ser. No. 61/370,070 that is hereby incorporated by reference herein in its entirety.

Figure 33:
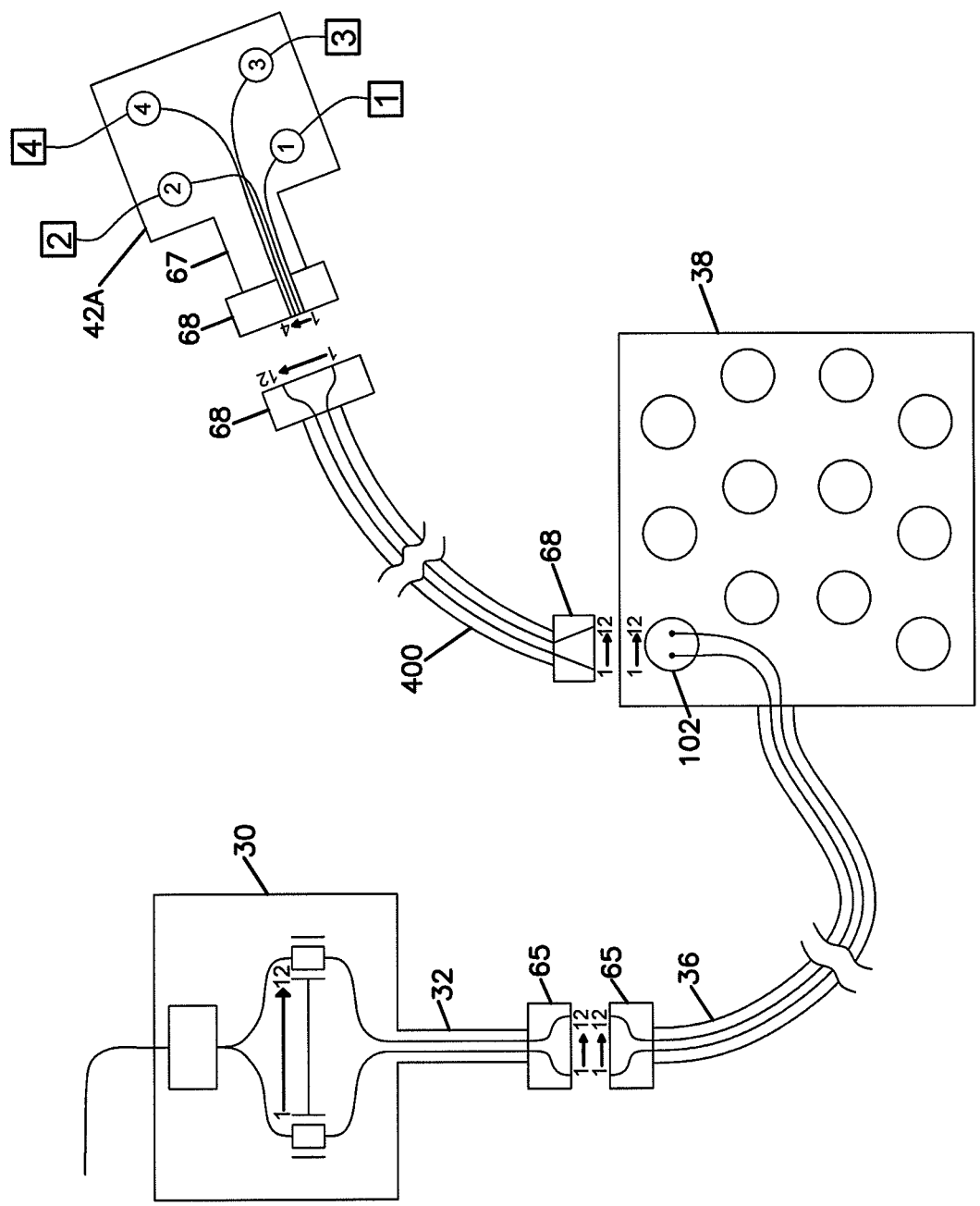
FIG. 33 illustrates a patching system in accordance with the principles of the present disclosure.
Figure 34:
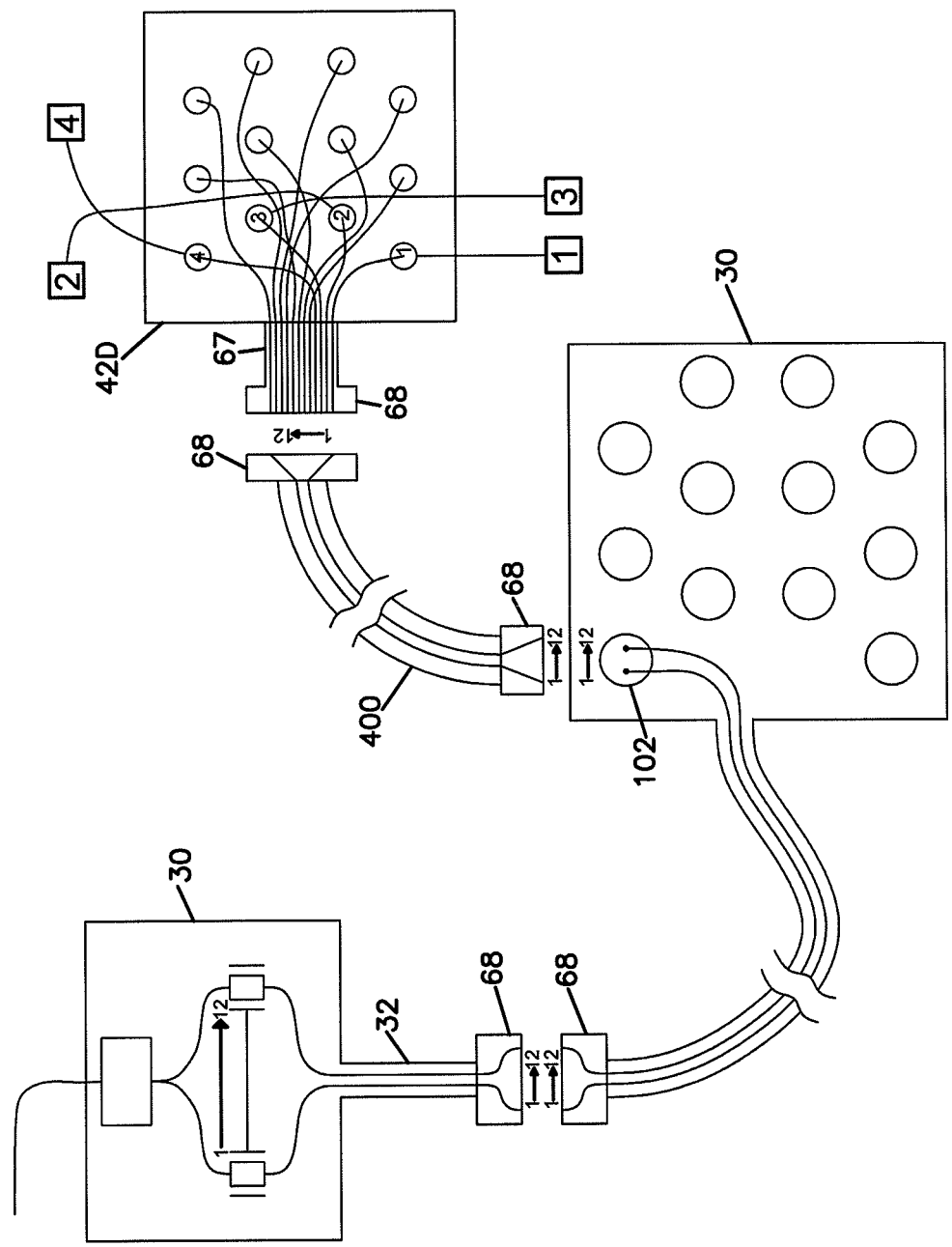
FIG. 34 illustrates a capacity upgrade to the patching system of FIG. 33.

The use of patch cords can assist in providing upgrades without requiring splicing. For example, FIG. 33 shows a system in which a twelve-fiber patch cord is routed through an underground conduit from collector box 38 to a 4-port multi-service terminal 42A. The patch cord has twelve fibers and hardened multi-fiber fiber optic connectors 68 supporting the twelve fibers at each end of the cable. One of the hardened multi-fiber optical connectors is plugged into one of the ports 102 of the collector box 38 while the other hardened multi-fiber fiber optic connector 68 of the patch cable is plugged into a corresponding hardened multi-fiber optical connector 68 mounted at the end of a short tether 67 of the multi-service terminal 44A. In this configuration, fibers 1-4 at a termination region of the fiber distribution hub 30 correspond to positions 1-4 of the various hardened multi-fiber optical connectors 68 used on the output cable 32 from the fiber distribution hub, the distribution cable 36 routed to the collector box 38, and the connectors 68 provided at the ends of the patch cord. Positions 1-4 of the ferrules on the termination panel correspond to ports 1-4 of the four port multi-service terminal 444A. Fibers 5-12 are currently unused and are available for ready upgrade in the event it is necessary to increase service capacity in region adjacent the multi-service terminal 44A. To upgrade service, the tether 67 of the terminal 42A can be disconnected from the patch cord by disconnecting the mated hardened multi-fiber fiber optic connectors 68. Thereafter, a larger capacity multi-service terminal (e.g., a twelve-port terminal) can be plugged into the patch cord to provide increased capacity. Once plugged in, ports 1-4 (see FIG. 34) of the twelve-port terminal still correspond to the same four subscribers. Thus, positions 1-4 at the termination panel still correspond to the same subscribers. However, fibers 5-12 are now active and are available for additional subscribers.

FIG. 35 shows a cable arrangement 500 that can be used to replace the collector box 38. Cable arrangement 500 is depicted as including a 144-fiber patch cable, although other numbers of fibers could be used as well (e.g., 74 fibers, 288 fibers, etc.). The fibers within the cable are grouped into twelve groups of twelve. Each group of fibers is terminated by a multi-fiber fiber optic connector 68 at a first end 501 of the cable. Similarly, each of the groups of twelve fibers are terminated by a separate multi-fiber optical connector 65 at a second end 503 cable. The cable has cable break out regions adjacent each of the ends. At the cable break out regions, individual broken out cable portions 507 are broken out from a main region 509 of the cable. Each of the individual broken out cable portions 507 are terminated with a separate hardened multi-fiber fiber optic connector 65. In certain embodiments, the broken out cable portions 507 on one end of the cable have different lengths such that the multi-fiber optic connectors 68 are staggered relative to one another to facilitate pulling the connectors 68 through underground conduit. In still other embodiments, the multi-fiber fiber optic connectors 68 are staggered relative to one another at both ends of the cable.

The invention claimed is:

1. A connection device comprising:
   a plurality of optical fibers, each optical fiber extending between a first end and a second end;
   a plurality of first multi-fiber connectors, each first multi-fiber connector including a first multi-fiber ferrule that terminates the first ends of at least some of the optical fibers, each first multi-fiber ferrule having fiber positions at which the first ends of the respective optical fibers are received; and
   a plurality of second multi-fiber connectors, each second multi-fiber connector including a respective second multi-fiber ferrule that terminates the second ends of at least some of the optical fibers, wherein each of the second multi-fiber ferrules also has a common number of fiber positions as the first multi-fiber ferrules, wherein the first and second multi-fiber ferrules have fiber positions 1 to N, wherein each of the second multi-fiber ferrules receives the second end of a respective one of the optical fibers at fiber position 1, wherein none of the second multi-fiber ferrules of the plurality of second multi-fiber connectors receives the second end of one of the optical fibers at fiber position N.

2. The connection device of claim 1, wherein one of the plurality of second multi-fiber connectors terminates fewer optical fibers than another of the plurality of second multi-fiber connectors.

3. The connection device of claim 1, wherein one of the plurality of second multi-fiber connectors terminates a common number of the optical fibers as another of the plurality of second multi-fiber connectors.

4. The connection device of claim 1, wherein the plurality of second multi-fiber connectors includes three second multi-fiber connectors.

5. The connection device of claim 1, wherein the plurality of optical fibers includes twelve optical fibers.

6. The connection device of claim 1, wherein each first multi-fiber connector is a hardened multi-fiber connector.

7. The connection device of claim 6, further comprising a housing, wherein each of the plurality of second multi-fiber connectors is carried by the housing.

8. The connection device of claim 7, wherein the housing defines a plurality of ports at which the plurality of second multi-fiber connectors is accessible.

9. The connection device of claim 7, wherein each first multi-fiber connector is disposed at a free end of a respective multi-fiber optical cable coupled to the housing.

10. The connection device of claim 1, wherein the plurality of second multi-fiber connectors includes a plurality of hardened multi-fiber connectors.

11. The connection device of claim 10, wherein each hardened second multi-fiber connector include an environmental seal to prevent moisture intrusion into the connector.

12. The connection device of claim 10, wherein each hardened second multi-fiber connector include a threaded fastener.

13. The connection device of claim 10, wherein one of the hardened second multi-fiber connectors is a hardened multi-fiber optical plug.

14. The connection device of claim 10, wherein one of the hardened second multi-fiber connectors is a hardened multi-fiber optical jack.

15. The connection device of claim 1, wherein a portion of the optical fibers is wound around a cable spool.

16. The connection device of claim 1, further comprising a cable jacket surrounding the optical fibers.

* * * * *